(12) United States Patent
Dittia et al.

(10) Patent No.: US 10,430,279 B1
(45) Date of Patent: Oct. 1, 2019

(54) DYNAMIC RAID EXPANSION

(71) Applicant: Tintri by DDN, Inc., Chatsworth, CA (US)

(72) Inventors: Zubin D. Dittia, San Mateo, CA (US); Shobhit Dayal, San Francisco, CA (US); John Murayama, Campbell, CA (US)

(73) Assignee: Tintri by DDN, Inc., Chatsworth, CA (US)

( * ) Notice: Subject to any disclaimer, the term of this patent is extended or adjusted under 35 U.S.C. 154(b) by 60 days.

(21) Appl. No.: 15/702,557

(22) Filed: Sep. 12, 2017

Related U.S. Application Data

(60) Provisional application No. 62/464,219, filed on Feb. 27, 2017.

(51) Int. Cl.
*G06F 11/10* (2006.01)
*G06F 3/06* (2006.01)

(52) U.S. Cl.
CPC .......... *G06F 11/1096* (2013.01); *G06F 3/064* (2013.01); *G06F 3/0619* (2013.01); *G06F 3/0689* (2013.01)

(58) Field of Classification Search
CPC .... G06F 11/1096; G06F 3/0619; G06F 3/064; G06F 3/0689
USPC ..... 714/764, 768, 769, 770, 773, 6.22, 6.24; 711/103, 113, 114, 170
See application file for complete search history.

(56) References Cited

U.S. PATENT DOCUMENTS

| | | | | |
|---|---|---|---|---|
| 7,051,155 | B2 * | 5/2006 | Talagala | G06F 11/1076 711/114 |
| 7,802,063 | B1 * | 9/2010 | Chatterjee | G06F 3/0605 707/781 |
| 8,700,951 | B1 * | 4/2014 | Call | G06F 11/1441 714/22 |
| 8,874,680 | B1 * | 10/2014 | Das | H04L 67/1095 709/212 |
| 9,110,835 | B1 * | 8/2015 | Call | G06F 11/1441 |
| 9,569,306 | B1 * | 2/2017 | Camp | G06F 11/108 |
| 9,690,801 | B1 * | 6/2017 | Ioannou | G06F 3/0601 |
| 9,830,110 | B2 * | 11/2017 | Patel | G06F 3/0608 |
| 9,838,041 | B1 * | 12/2017 | Lazier | G06F 16/113 |
| 9,952,781 | B2 * | 4/2018 | Orme | G06F 12/0238 |
| 9,959,059 | B2 * | 5/2018 | Orme | G06F 12/0238 |
| 9,990,263 | B1 * | 6/2018 | Tian | G06F 11/2094 |
| 9,998,150 | B1 * | 6/2018 | Lazier | G06F 11/14 |
| 10,009,044 | B1 * | 6/2018 | Lazier | G06F 16/113 |
| 2004/0024963 | A1 * | 2/2004 | Talagala | G06F 11/1076 711/114 |
| 2004/0123032 | A1 * | 6/2004 | Talagala | G06F 11/1076 711/114 |
| 2008/0250199 | A1 * | 10/2008 | Lubbers | G06F 3/061 711/113 |
| 2014/0173186 | A1 * | 6/2014 | Randall | G06F 12/0866 711/103 |

(Continued)

*Primary Examiner* — John J Tabone, Jr.
(74) *Attorney, Agent, or Firm* — Van Pelt, Yi & James LLP

(57) ABSTRACT

Dynamic RAID expansion is disclosed, including: incrementally expanding a redundant storage system comprising a plurality of storage drives by adding one or more storage drives to the plurality of storage drives; and storing, for each stripe included in the redundant storage system, metadata indicating which storage drives in the redundant storage system store valid data for the stripe.

20 Claims, 18 Drawing Sheets

(56) References Cited

U.S. PATENT DOCUMENTS

| | | | | |
|---|---|---|---|---|
| 2015/0220385 A1* | 8/2015 | Wood | ............... | G06F 11/108 |
| | | | | 714/6.24 |
| 2016/0110125 A1* | 4/2016 | Orme | ............... | G06F 12/0238 |
| | | | | 711/102 |
| 2016/0110249 A1* | 4/2016 | Orme | ............... | G06F 12/0238 |
| | | | | 714/6.24 |
| 2016/0188424 A1* | 6/2016 | Walls | ............... | G06F 11/1662 |
| | | | | 714/6.3 |
| 2018/0253363 A1* | 9/2018 | Tian | ............... | G06F 11/2094 |

\* cited by examiner

| Stripe Number | SSD 1 | SSD 2 | SSD 3 | SSD 4 | SSD 5 | SSD 6 | SSD 7 |
|---|---|---|---|---|---|---|---|
| 1 | 1 | 1 | 1 | 0 | 0 | 0 | 0 |
| 2 | 1 | 1 | 1 | 1 | 1 | 1 | 1 |
| 3 | 1 | 1 | 1 | 1 | 1 | 0 | 0 |
| 4 | 1 | 1 | 1 | 1 | 1 | 1 | 1 |
| 5 | 1 | 1 | 1 | 1 | 1 | 0 | 0 |

1202

1 = Valid data is stored in the stripe unit
0 = Valid data is not stored in the stripe unit

FIG. 12A

| Number of Drives That Store Valid Data in the Stripe |
|---|
| 3 |
| 7 |
| 5 |
| 7 |
| 5 |

| Stripe Number |
|---|
| 1 |
| 2 |
| 3 |
| 4 |
| 5 |

FIG. 12B

DYNAMIC RAID EXPANSION

CROSS REFERENCE TO OTHER APPLICATIONS

This application claims priority to U.S. Provisional Patent Application No. 62/464,219 entitled DYNAMIC RAID EXPANSION filed Feb. 27, 2017 which is incorporated herein by reference for all purposes.

BACKGROUND OF THE INVENTION

A redundant array of independent disks (RAID) system may be expanded by adding additional one or more drives to the group of existing drives. For example, additional drives may be added to increase the storage capacity of data and/or increase the redundancy in the RAID system.

In conventional systems using RAID, capacity is typically expanded by adding another RAID group composed of a new set of drives. This is expensive and inefficient because each individual RAID group incurs overhead from space dedicated for storing RAID parity. Another drawback in the conventional systems that expand space by adding a new RAID group is that space can be expanded only by adding a minimum set of drives and this minimum number is typically much greater than one, e.g., 20 drives.

In some conventional systems, an existing RAID group may be expanded with new drives but the new free space does not become available until the existing stripes in the RAID group have been reorganized into wider stripes that span the new width of the RAID group. Consider a stripe of width 7 units: 5 data units and two parity units, then the 5 data units may be considered the data payload section of the stripe, in this example. A limitation is that most RAID groups have a fixed data payload size per stripe across all the stripes in the RAID group; the data payload size is not configurable on a stripe-by-stripe basis. For this reason, when a new drive is added, then all existing stripes must be reconfigured to accommodate the new drive before new free space becomes available. The reconfiguration process may be a background process but the newly added free space does not become free until after the background process has completed.

Finally, conventional storage vendors do not offer the functionality of flexibly expanding an existing RAID group. Regardless of the internal implementation for space expansion, conventional storage vendors typically offer expanding total space by a predetermined number of drives to their consumers. Conventional storage vendors often either offer a shelf of drives to their customers or an expansion pack that is composed of more than one and typically, a fixed number of drives, such as 10 to 20 drives, for example.

BRIEF DESCRIPTION OF THE DRAWINGS

Various embodiments of the invention are disclosed in the following detailed description and the accompanying drawings.

FIG. 12A is a first example of a table that stores data indicating how many storage drives (stripe units) within a stripe store valid data.

FIG. 12B is a second example of a table that stores data indicating how many storage drives (stripe units) within a stripe store valid data.

DETAILED DESCRIPTION

Figure 1:
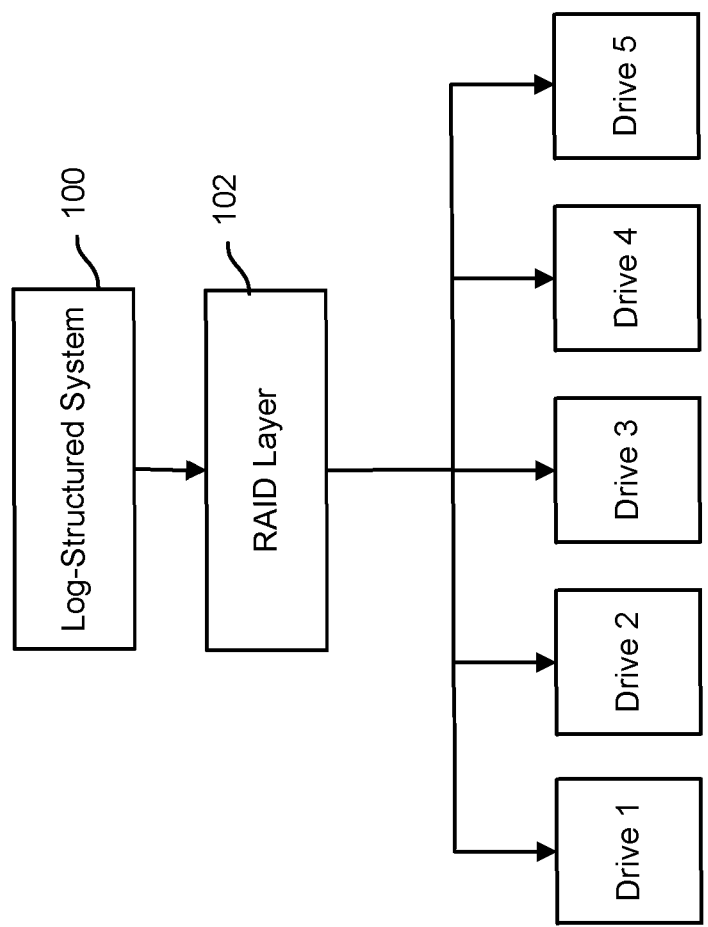
FIG. 1 is a redundant storage system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more drives, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Redundant array of independent disks (RAID) allows multiple storage drives to be combined to store a large filesystem or object store, with redundancy built into it to prevent data loss in the presence of one or more drive failures, and with recovery mechanisms to restore data from a failed drive onto a new healthy drive. The storage drives themselves could be part of a single controller system, or could be accessible from multiple controllers, or could reside in different systems (e.g., a distributed RAID group).

RAID stores data in "stripes" spanning all drives currently in the RAID group. The data from any given stripe on a single storage drive is called a "stripe unit," and can be an arbitrary number of bytes. Put another way, a "stripe" refers to a group of stripe units, where each unit belongs to one drive in the group. As such a "stripe unit" is a sub part of a drive. A stripe may include some number of user data stripe units, and some number of parity data stripe units. The parity stripe units can be used to reconstruct user data stripe units if any of the drives containing user data stripe units experience data corruption or failure. The number of parity stripe units in a stripe decides the amount of redundancy in the RAID group, i.e., the number of drive failures that can be tolerated before there is actual loss of data.

FIG. 1 is a redundant storage system in accordance with some embodiments. In FIG. 1, at least Drives 1, 2, 3, 4, and 5 form a group of redundant storage drives that stores data and/or parity information. For example, in the example shown in FIG. 1, each of Drives 1, 2, 3, 4, and 5 may be a hard disk drive (HDD) or a solid state drive (SSD). The Drives 1, 2, 3, 4, and 5 form a RAID group that is managed in part by RAID layer 102. The Drives 1, 2, 3, 4, and 5 in the RAID group comprise a logical container. At least some of Drives 1, 2, 3, 4, and 5 are configured to store at least some data that is redundantly stored on one or more other drives of the group based on a protocol of data distribution of a RAID scheme that is associated with the RAID group. Typically, data stored in a RAID group is "striped" across the drives such that logically sequential data is segmented in a way that accesses of sequential segments can be made to different drives. RAID layer 102 is configured to receive an input set of data, process the input data according to a protocol of data distribution (e.g., generate parity information based on the input data) that is applied to the RAID group, and store the outputted data across Drives 1, 2, 3, 4, and 5 according to the protocol of data distribution that is applied to the RAID group.

When new user data is written to a RAID group such as the group comprising Drives 1, 2, 3, 4, and 5, it is usually stored in a buffer in primary memory until there are enough user data "blocks" to partially or mostly fill the user data stripe units of a stripe; at that point, the parity stripe units are computed, and the entire stripe gets written to a free (unused) stripe of the currently active storage drives in the RAID group.

User data can be read at any point from the storage drive on which it was originally written as part of a stripe. However, if that drive is down, or if the data that is read is corrupted, it can be reconstructed by reading data from other stripe units (including parity).

In various embodiments, log-structured system 100 is built on RAID subsystem that comprises RAID layer 102 and Drives 1, 2, 3, 4, and 5. In some embodiments, log-structured system 100 comprises a log-structured object store. The object store associates each object, which may be an arbitrary number of bytes in size, which is written to it with a (typically shorter) name. Users of the object store may retrieve objects by supplying the name of the object. Higher layer constructs such as filesystems (not shown) can be layered on top of an object store, and may use the object store to store things such as blocks in a file, filesystem metadata, etc. In some embodiments, log-structured system 100 comprises a log structured filesystem, in which case there would be no explicit "object store." For illustrative purposes, various examples described herein assume the use of log-structured object store that is built on the RAID system.

In a log-structured system, when a data block is overwritten, the new version of the block is always written to a new location, and the old version of the block continues to exist in the storage until such time as it is garbage collected and the corresponding space freed up, which can happen at any time in the future. In non-log-structured systems, data blocks are overwritten in-place, so that the old version of a block is obliterated by the new version immediately. As will be described in further detail below, in various embodiments, in a log-structured system, older versions of data blocks need to be garbage collected and this existing garbage collection mechanism can be leveraged to gradually move blocks that are still useful (i.e., they have not been freed or overwritten with newer versions) onto all the drives including any new drives that have been added in a RAID group expansion. As such, for log-structured systems, in various embodiments, the existing garbage collection mechanism can be exploited to perform N-drive (where N is an integer of one or greater) expansion of an existing RAID group without requiring a separate mechanism to move data to newly added drives of the RAID group. Systems that are not log-structured but which still already have some existing mechanism to compact and reclaim free space could potentially use that existing mechanism to write valid data to newly expanded stripes of an expanded RAID group in a manner similar to how the garbage collection mechanism can be leveraged for log-structured systems.

Objects (e.g., comprising new user data) written to an object store are collected and written out to free stripes in the RAID group as described above. As mentioned above, objects or other types of data are first written to an in-memory buffer. Once the buffer is filled, the content written to the buffer is written to a free stripe of the RAID group. If an existing object with a given name is overwritten, then the new version of the object may get written to a different stripe (e.g., in a log-structured system). Thus, an object with a given name may at any given time be stored multiple times within the same stripe or in different stripes; only one of these versions of the object is the most "current"; the remaining occurrences are versions of the object as it existed at some previous point in time, and are thus obsoleted by the current version. Additionally, if an object with a given name is deleted, then the corresponding object data in RAID also becomes obsolete.

The object store keeps track of the location (e.g., which stripe, the stripe unit, and the offset within the stripe unit) of the most current version of an object. By consulting this information, the object store can always detect "liveness" of an object stored in the RAID group; it is considered "live" if the location of the object matches the location where the current version of the object resides and not live if the location of the object does not match the location where the current version of the object resides. Objects that are not live are obsolete and do not need to be stored (e.g., obsolete objects are to be removed from the RAID group over time).

As time passes, the log-structured object store may build up a large number of obsolete objects. Since these take up unnecessary space, it is important to somehow remove them from the system and reclaim the space they take up. To do this, the log-structured object store implements a garbage collection process, which works by reading one or more "source" stripes of the RAID group containing data, and copying forward only the live data from these stripes into new free "target" stripes of the RAID group. After this is done, the source stripes can be declared to be free, and can be used in the future to write either new incoming data, or serve as target stripes for the garbage collection process to use in the future. If the source stripes contain a lot of obsolete objects, then the garbage collection process will end up freeing up more stripes than it uses, thus allowing space to be reclaimed for future use.

Embodiments of dynamic expansion of a redundant storage system are described herein. In various embodiments, the redundant storage system comprises a RAID system. A RAID system comprising a plurality of storage drives is incrementally expanded by adding one or more additional storage drives to the plurality of storage drives for each expansion. An example reason for expanding the RAID system is to grow the overall system capacity. Expansion of a redundant storage system can be done repeatedly, growing the RAID group with an arbitrary number of additional storage drives in an arbitrary number of increments, with each increment comprising N storage drives, where N is an integer that is at least one. In various embodiments, incrementally expanding a RAID system comprises successively adding one or more additional storage drives to a RAID system, without requiring the previously added new one or more storage drives to be completely written to before allowing a subsequent expansion from taking place and also without requiring a predetermined/fixed number of new storage drives to be added per each expansion. Metadata is stored for each stripe of the plurality of storage drives that indicates at least how many storage drives store valid data in that stripe.

In some embodiments, a log-structured system is layered on top of the RAID group and is used to overload the garbage-collection feature of the log-structured object store to opportunistically write data to the newly added drives. The garbage collection mechanism that is inherent to any log-structured filesystem can be overloaded to re-organize data and parity within an existing stripe into a wider stripe that includes the newly added drives. The wider stripe is able to accommodate more space than was previously present when the new drive(s) were not part of the stripe. In some embodiments, an existing garbage collection or another compaction mechanism may already be presented in a system that is not necessarily log-structured, and in such cases, these existing mechanisms can be similarly overloaded in order to cheaply and efficiently re-organize stripes opportunistically to incorporate additional free space from newly added drives in an expanded RAID system, without needing a wholly separate mechanism exclusively dedicated to that purpose.

For example, a RAID group includes 10 storage drives, 8 of which are data drives and 2 of which are parity drives. If it is desired to add 10 more drives, then, conventionally, a new RAID group of 10 drives is added to provide 8 more data drives and 2 more parity drives. However, if the 10 new drives could be added to the existing RAID group, then it is possible to add 10 more data drives and the 10 new drives can share the existing parity drives. Not only can expanding an existing RAID group as described herein offer the opportunity to share existing parity drives, an expanded RAID group also provides the opportunity to create wider stripes within the RAID group that span both the old drives and the new, which leads to a lower parity overhead per user data block, in a stripe.

Traditionally, data is redistributed onto new drives and the expansion is not considered to be "complete" until this redistribution is done. Redistribution involves copying data or parity from existing drives onto the new drives until the system reaches a state where everything is consistent according to a revised RAID layout. Only after the expansion is "complete" in this sense is the user allowed to initiate another expansion by adding even more drives. The system may take up to hours to complete the process of redistribution, during which period additional expansion operations may not be possible. In contrast, embodiments of dynamically expanding RAID groups as described herein does not require any data to be moved onto the new drives during expansion, as this is done opportunistically, for example, using an existing garbage collection mechanism to write garbage collected live data and/or new data to the newly expanded stripes. For this reason, in embodiments of dynamically expanding RAID groups as described herein, the expansion of a RAID group is considered "completed" almost instantaneously once certain metadata is updated (e.g., once the superblock headers have been changed to reflect the presence of the new drives). This feature of instantaneously expanding an existing RAID group enables the option to perform multiple expansion operations successively without having to wait long periods of time for data to be moved/redistributed to the correct place between one expansion operation and the next, as will be described in further detail below.

Figure 2:
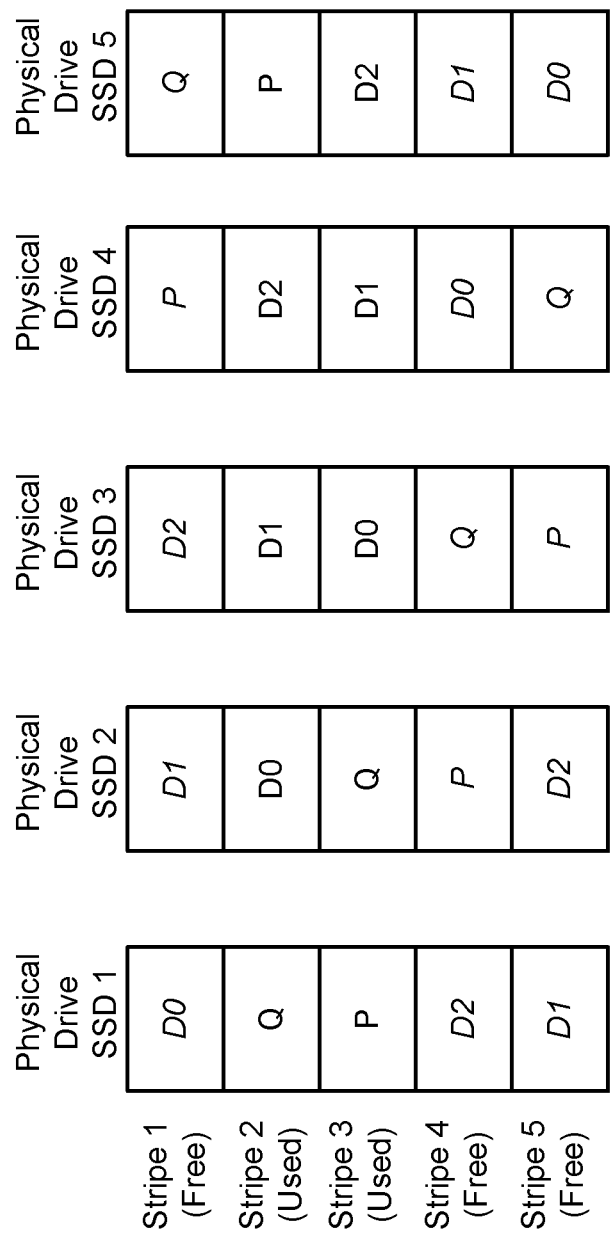
FIG. 2 shows an example of a RAID group that includes five storage drives, prior to an expansion.

FIG. 2 shows an example of a RAID group that includes five storage drives, prior to an expansion. The five storage drives includes two parity data storage drives and three user data storage drives. In the example of FIG. 2, the RAID scheme that is used to store the user data and parity data to the five storage drives rotates the data such that the stripe units at which user data (D0, D1, and D2) and the stripe units at which parity data (P and Q) are rotated over the five stripes of the RAID group. In a RAID group with parity rotation, physical storage drives do not have an one-to-one mapping to logical storage drives. The parity data (P and Q) stripe units in a particular stripe may each be computed based on the user data (D0, D1, and D2) stripe units that are present in that same stripe. In the example, each storage drive comprises a SSD and is associated with a physical drive identifier (SSD1, SSD2, SSD3, SSD4, and SSD5). Each of the five stripes is also associated with a stripe number (Stripe 1, Stripe 2, Stripe 3, Stripe 4, and Stripe 5) as well as a status of whether the stripe is "free" (or "unused") or "used." In various embodiments, a "free" stripe is a stripe to which its previously written content or lack of content may be overwritten by a new stripe of data and/or to which no data has ever been written. For example, a new stripe of data to be written to a free stripe may comprise new user data or live/current (non-obsolete) objects that are being moved by a garbage collection mechanism. A stripe may become free/unused, for example, if the live/current versions of objects stored in it are moved by a garbage collection mechanism to a new, free stripe of the RAID group. In various embodiments, a "used" stripe is a stripe to which live/current versions of objects are still currently stored at that stripe.

Figure 3:
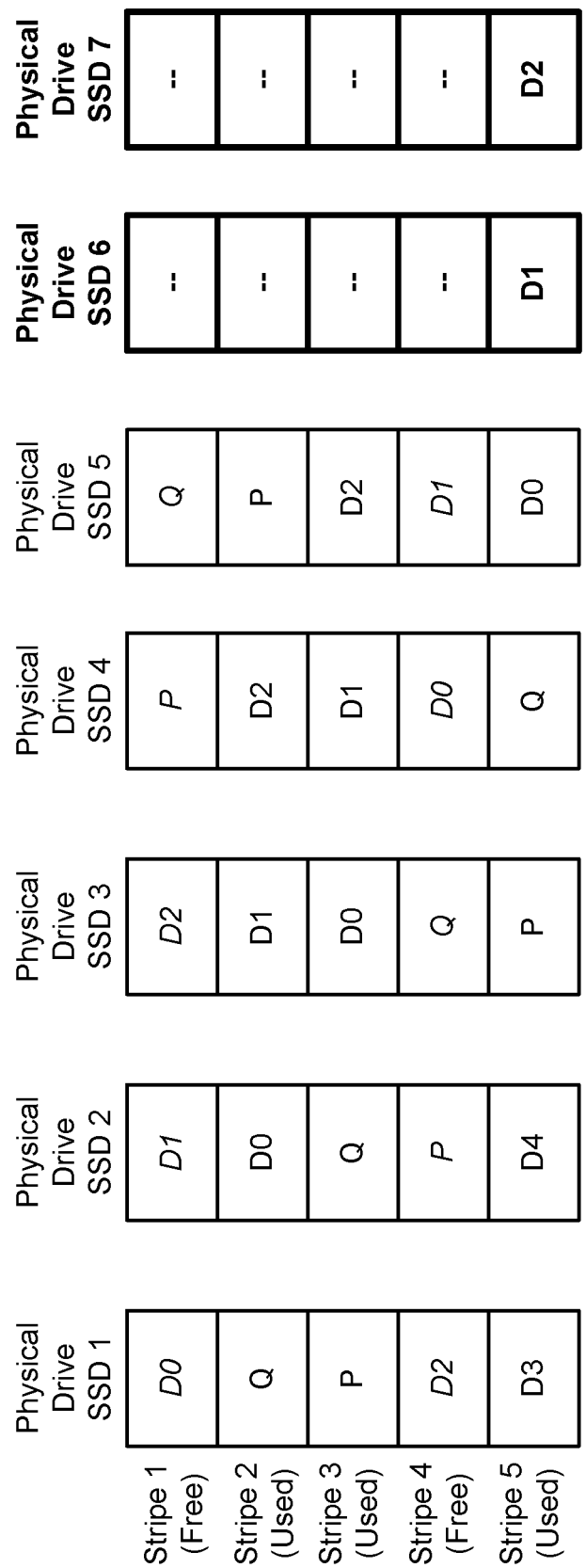
FIG. 3 shows an example of expanding a RAID group by adding two additional storage drives to five existing storage drives.

As shown in the example of FIG. 2, each stripe unit of the RAID group of five storage drives are written to with valid data that comprises either user data (D0, D1, and D2) or parity data (P and Q). Each stripe unit in the example of FIG. 2 is also five stripe units in width because each stripe spans five storage drives. As such, a stripe with five stripe units worth of data would be written to a free stripe of the RAID group in FIG. 2. For example, an in-memory buffer that is five stripe units in width is used to collect new user data and/or live data (objects) to be moved by a garbage collection mechanism and once the buffer meets a given condition (e.g., the buffer becomes full), the contents of the in-memory buffer are flushed to a free stripe of the RAID group. In the event that the storage capacity of the RAID group is desired to be expanded, additional one or more storage drives may be added to the RAID group. FIG. 3, below, shows an example of adding two additional SSD storage drives to the existing five SSD storage drives of the RAID group shown in FIG. 2.

FIG. 3 shows an example of expanding a RAID group by adding two additional storage drives to five existing storage drives. As shown in the example of FIG. 3, two additional SSD storage drives (with physical drive identifiers SSD6 and SSD7) are added to the five existing drive storage drives of the RAID group that was shown in FIG. 2. After storage drives SSD6 and SSD7 are added, each of the five stripes of the RAID group is expanded from five stripe units in width to seven stripe units in width. However, immediately after the expansion (the addition of the two storage drives), the additional two stripe units added by new storage drives SSD6 and SSD7 to each stripe do not include valid (user or parity) data until the stripes are each written to with seven stripe units worth of data. Put another way, stripes that were written before the expansion step would naturally contain stripe units only on the storage drives that existed in the RAID group at the time that the stripe was written; stripe units of any new storage drives added after that point would not contain any valid data. In FIG. 3, each stripe unit of new storage drives SSD6 and SSD7 that do not yet include valid data are labeled with "--."

In various embodiments, after each expansion of a RAID group, the in-memory buffer that is used to hold new user data and/or live data (objects) to be moved by a garbage collection mechanism is expanded to match the expanded width of each stripe. In various embodiments, after the RAID group is expanded to include additional storage drives, the expanded stripes are opportunistically written to by flushing a correspondingly expanded in-memory buffer to free stripes of the RAID group. The expanded stripes are "opportunistically" written to in the sense that an expanded stripe is only written to when the expanded in-memory buffer meets a given flush condition (e.g., at least a threshold percentage of the capacity of the buffer has been filled with data). In the example of FIG. 3, because the RAID group was expanded from having five to seven storage drives, the width of the in-memory buffer is correspondingly expanded from five to seven stripe units. As such, a new stripe of data is not flushed from the expanded buffer until seven stripe units (e.g., or a threshold percentage thereof) worth of data are available to be written to a free stripe of the RAID group. For example, as shown in FIG. 3, after five storage drives were expanded to seven storage drives, Stripe 5, which was free, was written to with seven stripe units worth of valid data. As such, expanded Stripe 5 is completely written to while each of Stripes 1 through 4 includes stripe units in physical drives SSD6 and SSD7 that do not store valid data. Because the flushing of content from the expanded in-memory buffers to each expanded stripe in the RAID group does not occur instantaneously (e.g., and instead, only when a flush condition is met), different stripes of the expanded RAID group may concurrently store valid data in a different number of storage drives (stripe units) for some time.

Performing read requests to a RAID group for which certain stripe units do not yet include valid data (e.g., due to a recent expansion of the RAID group) and for which the user data and parity data may be rotated across different stripes of the RAID group (such as the RAID group that is shown in FIGS. 2 and 3) may result in errors in which a read request is incorrectly mapped to a stripe unit that does not store the requested data or does not store valid data at all. This is because, in a RAID scheme that rotates user data and parity data (e.g., RAID schemes that are RAID-5 and higher RAID levels), the locations (stripe units) within each stripe at which user data and parity data are stored depends on how many stripe units existed in that stripe at the time data was written to the stripe. In order to correctly process read requests to the expanded RAID group before each of the expanded stripes are completely written to, in various embodiments, it is first determined which stripe units in each stripe includes valid data before a read request may be completed for that stripe. In some embodiments, metadata is maintained in either volatile or non-volatile storage that indicates for each stripe in the RAID group, how many and/or which storage drives (stripe units) store valid data and which storage drives (stripe units) do not store valid data. As such, the information that indicates which storage drive (stripe units) stores valid data in a stripe may be used to correctly map/translate a read request to the corresponding physical storage drive in a parity rotation RAID scheme in order to retrieve the desired data. Given the information that indicates which storage drive (stripe units) stores valid data in a stripe, the RAID group may be successively expanded (e.g., expanded from five storage drives to seven storage drives and then expanded to ten storage drives) without needing all the expanded stripes to be completely written to before permitting a subsequent expansion because such information can be used to ensure that read requests are correctly handled during the interims in which not every expanded stripe has been completely written to.

Performing read requests to a RAID group for which certain stripe units do not yet include valid data (e.g., due to a recent expansion of the RAID group) and for which the user data and parity data are not rotated across different stripes of the RAID group may not require obtaining metadata that indicates how many drives store valid data in a stripe because may be a direct one-to-one mapping of logical drive numbers to physical drive numbers, at least for some reads where the address of the read request provides the stripe number, the stripe unit number and the offset within the stripe. However, even in a RAID scheme in which parity rotation is not employed, garbage collection may be used to opportunistically write valid data to newly expanded stripes of a dynamically expanded RAID group.

Figure 4:
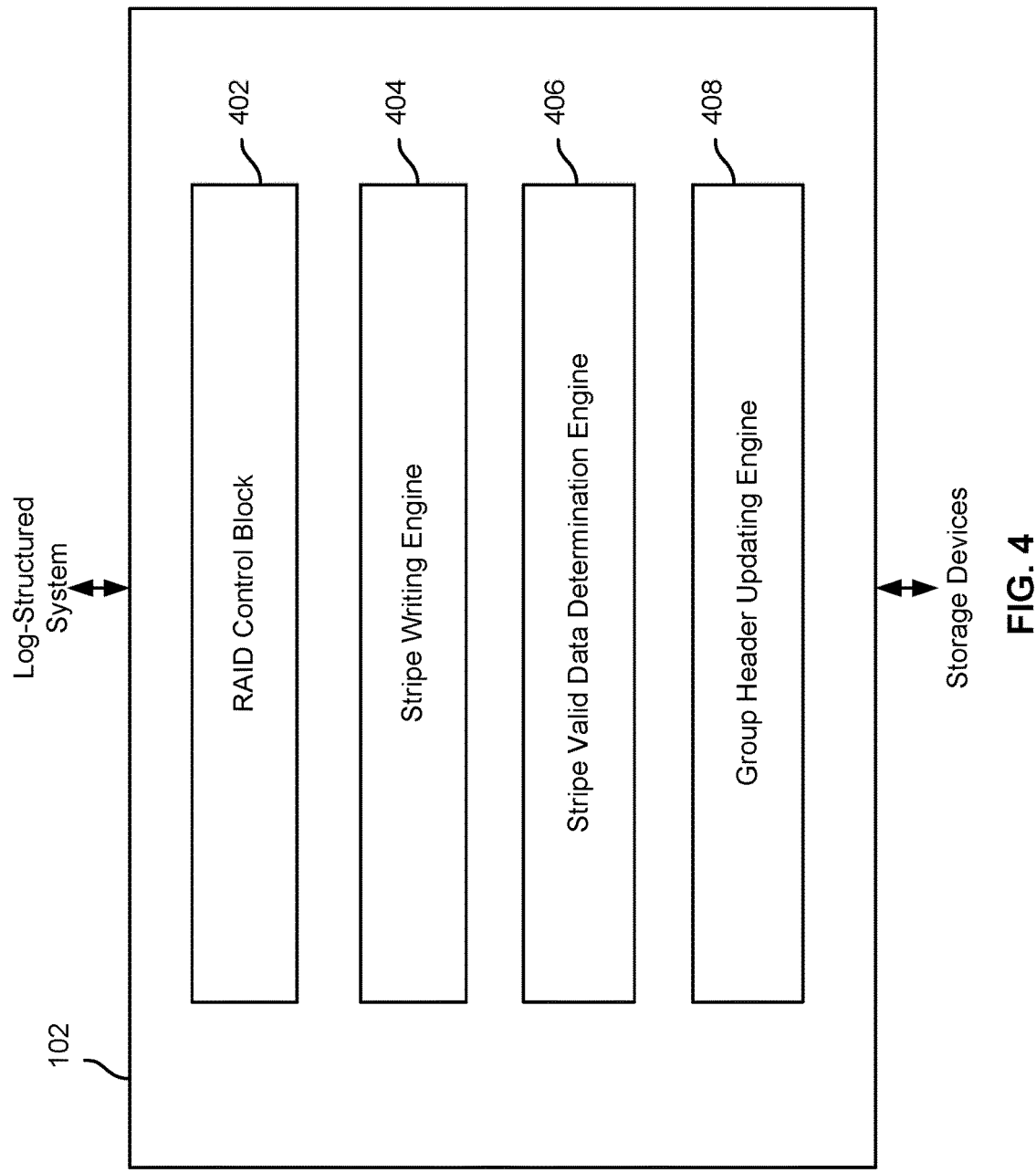
FIG. 4 is a diagram showing an example of a RAID layer.

FIG. 4 is a diagram showing an example of a RAID layer. In some embodiments, RAID layer 102 of FIG. 1 may be implemented using the example of FIG. 4. In the example, the RAID layer comprises RAID control block 402, stripe writing engine 404, stripe valid data determination engine 406, and group header updating engine 408. Each of RAID control block 402, stripe width tracking engine 404, stripe writing engine 404, stripe valid data determination 406, and group header updating engine 408 may be implemented using one or both of hardware and software.

RAID control block 402 is at least configured to receive requests (e.g., read requests or write requests sent by an application), to service the requests, and to send the results (e.g., requested data) back to the requesting application. In some embodiments, depending on the RAID scheme that is used to store data in the storage drives of the RAID group, the stripe units that store user data and the stripe units that store parity data rotate across the stripes in the RAID group. For example, parity rotation is typically employed in RAID-5 and higher RAID levels. As described above, after a RAID group is expanded with the addition of one or more new storage drives, the newly expanded stripes of the RAID group are opportunistically written to so there is a possibility that a read request to the RAID group may be received by RAID control block 402 before each of the expanded stripes has been completely written to. Prior to responding to the read request, in various embodiments, RAID control block 402 is configured to determine which stripe units (storage drives) included in the stripe, which is identified by the read request, stores valid data and which stripe unit (storage drives) included in the stripe do not store valid data. As will be described below, in some embodiments, stripe valid data determination engine 406 is configured to determine which stripe units (storage drives) in a stripe stores valid data. As such, in various embodiments, in response to receiving a read request for data stored at a particular stripe, RAID control block 402 is configured to query stripe valid data determination engine 406 to receive a response that indicates which stripe units of that particular stripe stores valid data and which do not. For RAID groups that employ parity rotation, RAID control block 402 is configured to use the information of which stripe units of that particular stripe stores valid data and which do to map/translate a specified logical storage drive number, stripe number, and offset within a stripe unit that is included in the request to the stripe unit belonging to the correct physical storage drive that stores the requested data. A detailed example of performing read requests to an expanded RAID group with parity rotation is described below with FIG. 16.

Stripe writing engine 404 is configured to cause expanded stripes of an expanded RAID group to be written to opportunistically. In various embodiments, in response to a detection of one or more new storage drives being added to the existing storage drives of a RAID group, stripe writing engine 404 is configured to expand the width each of one or more in-memory buffers to match the newly expanded width of each stripe of the expanded RAID group. For example, prior to the expansion, the RAID group had stripes that were each M stripe units in width. After the RAID group was expanded by k additional storage drives, then the stripes each become M+k stripe units in width. As such, stripe writing engine 404 would expand the in-memory buffers to span M+k stripe units instead of just M stripe units. Each in-memory buffer is configured to store data that is to be flushed to (i.e., written to) a free (unused) stripe of the RAID group in response to a flush condition being met (e.g., the in-memory buffer is full of data). In various embodiments, an in-memory buffer that is expanded comprises a buffer that is configured to store live/current versions of objects that are being moved by a garbage collection mechanism (e.g., that is run by a log-structured system that is built on top of the RAID layer). Therefore, in various embodiments, the garbage collection mechanism present in the log structured system is used to not only discard obsolete objects, but also to grow stripes and facilitate the expansion of the total capacity of the RAID group. In some embodiments, an in-memory buffer that is expanded comprises a buffer that is configured to store new user data (e.g., that are received as write requests by RAID control block 402) to be stored at the RAID group. In some embodiments, an in-memory buffer that is expanded comprises a buffer that is configured to store a combination of new user data and live/current versions of objects that are being moved by a garbage collection mechanism. As such, as a result of expanding such in-memory buffers, they will each be filled up with data that spans the expanded widths of the expanded RAID group and written to free stripes of the RAID group, thereby opportunistically populating each of the new stripe units of the RAID group over time. Thus, given enough time and activity, most or all of the stripes in the expanded RAID group would end up spanning all the storage drives in the group, including any newer storage drives added during an expansion step.

Stripe valid data determination engine 406 is configured to track which storage drives store valid data in each stripe of the RAID group. In various embodiments, stripe valid data determination engine 406 is configured to store metadata (e.g., a table) that indicates which storage drives store valid data in each stripe of the RAID group in either volatile storage (e.g., memory) or non-volatile storage (e.g., NVRAM) (so that it could be retrieved at recovery time). In some embodiments, stripe valid data determination engine 406 is configured to (e.g., at the startup of the RAID system or in response to a received read request) scan/read the stripe unit header of at least a subset of the stripe units in each stripe of the RAID group. In some embodiments, each stripe unit stores at least an identifier associated with the stripe that it belongs to and how many valid stripe units there are in the stripe it belongs to. Given the combination of the stripe identifier and the number of valid stripe units there are in the stripe that are read from at least one stripe unit in a stripe, in some embodiments, stripe valid data determination engine 406 is configured to infer which drives in the RAID group store valid data in that particular stripe. For example, if one or more stripe unit headers in the same stripe indicate that the stripe includes five stripe units that store valid data, then it can be inferred that the first five storage drives that were part of the RAID group store valid data in that stripe (because each subsequently added storage drive to a RAID group is associated with a physical storage drive identifier that denotes the chronological order in which the storage drive was added to the RAID group). In some embodiments, each stripe unit header stores information that indicates at least whether the corresponding stripe unit includes valid data or not. Stripe valid data determination engine 406 is configured to create the metadata (e.g., table) that stores indications of which stripe units in each stripe of the RAID group stores valid data based on its reading of the stripe unit headers. In some embodiments, stripe valid data determination engine 406 is configured to receive a query from RAID control block 402 regarding a read request that was received by RAID control block 402. Stripe valid data determination engine 406 is configured to read the stripe unit header that is associated with the stripe unit that is specified by the read request. Stripe valid data determination engine 406 may even update a relevant portion of the stored metadata based on the stripe header that it had recently read. In some embodiments, stripe valid data determination engine 406 is configured to store checkpoints on the metadata. For example, in the event the type of storage medium at which the metadata is stored does not permit in-place updates, stripe valid data determination engine 406 is configured to log updates to the metadata (e.g., the updates may indicate which stripe units have been written to with valid data and when) in non-volatile storage. For example, stripe valid data determination engine 406 is configured to detect when a stripe has been written to since the metadata was initially created and log the changes to the metadata that have been detected since the creation of the metadata. Then, when the RAID system starts up again (e.g., after a crash), stripe valid data determination engine 406 is configured to rewrite a new version of the metadata (e.g., in a new location in the storage medium) by merging together the logged updates with the previously stored version of the metadata. Thereafter, stripe valid data determination engine 406 is configured to continue to log new updates to the metadata. In some embodiments, stripe valid data determination engine 406 is configured to not store metadata that indicates which stripe units in each stripe of the RAID group stores valid data and instead, store the number of storage drives in each stripe that stores valid data in the metadata (e.g., address) of each object. That way, whenever an object is read, the number of storage drives that store valid data in the stripe to which the object is written is located is automatically available by simply extracting the information from the address of the object.

Group header updating engine 408 is configured to write group headers into each storage drives of a RAID group regarding how many and which storage drives are currently part of the RAID group. In various embodiments, a group header is written to a specific location (e.g., row) on each storage drive. When new storage drives are added to the RAID group, this fact needs to be recorded in the group headers. In various embodiments, a two-phase commit protocol along with a consensus protocol is used to make sure that a consistent view of the storage drives in a RAID group is available at any time, regardless of how many crash-restores happen while group header updating engine 408 writes the group headers to individual storage drives in the group. In various embodiments, to ensure that group headers are written consistently after an expansion phase, group header updating engine 408 first writes the headers to all the storage drives including the new drives to a completely different set of locations from the locations of the group headers currently in use. Only when these headers have been written to all storage drives, would these new headers be switched over to, at which point the old group headers can be safely discarded/ignored. By using different versions of group headers as described herein, it is possible to additionally achieve rollback, so that if the expansion does not successfully go through for any reason (e.g., one or more new drives fail or they are not visible from all controllers), the RAID group can be restored to the previous number of operating storage drives before any new data can be written to the new storage drives.

Figure 5:
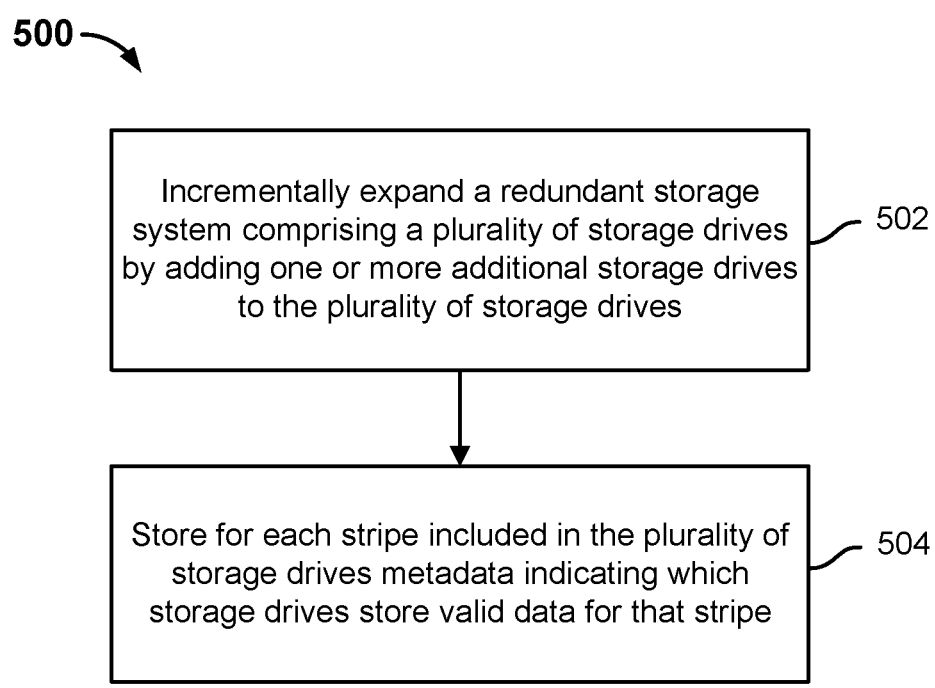
FIG. 5 is a flow diagram showing an embodiment of a process for dynamically expanding a redundant storage system.

FIG. 5 is a flow diagram showing an embodiment of a process for dynamically expanding a redundant storage system. In some embodiments, process 500 may be implemented by using RAID layer 102 of FIG. 1.

At 502, a redundant storage system comprising a plurality of storage drives is incrementally expanded by adding one or more additional storage drives to the plurality of storage drives. In various embodiments, one or more storage drives may be added to an existing RAID group to increase its capacity. Adding new storage drives to the existing RAID group adds stripe units from the new drives to the stripe units of an existing stripe, thereby effectively "expanding" every stripe in the RAID system. This assumes that the new storage drives contain at least as many stripe units (of the same size) as existing drives in the RAID group. In various embodiments, whenever stripes are written to after the addition of the new drives, these stripes would span all the drives in the RAID group, including the new storage drives. However, stripes that were written before the expansion step would naturally contain stripe units only on the storage drives that existed in the RAID group at the time that the stripe was written; stripe units of any new storage drives added after that point would not contain any valid data.

Incremental expansions of a RAID group could be performed at any time (and therefore "dynamically"), in various embodiments. In various embodiments, an already expanded RAID group could be expanded further, without requiring the previously added new one or more drives to be completely written to. In various embodiments, the number of storage drives added to the system could be different in each successive expansion, with no minimum requirement or maximum limit on the number of drives to be added per each expansion step. As a result of permitting incremental expansions of a RAID group, depending on when a stripe was written, it could potentially span a different numbers of storage drives.

At 504, for each stripe included in the plurality of storage drives, metadata indicating which storage drives store valid data for that stripe is stored. Metadata that indicates which storage drives was present in each stripe when that stripe was written to may be stored and used to determine which storage drives contain valid data in any given stripe. In particular, certain RAID groups rotate user data and parity data across the stripes and so the information of which storage drives are included in which stripe (e.g., at the time at which the stripe was written) may be used to map a read request to the correct stripe unit of the corresponding physical storage drive.

Figure 6:
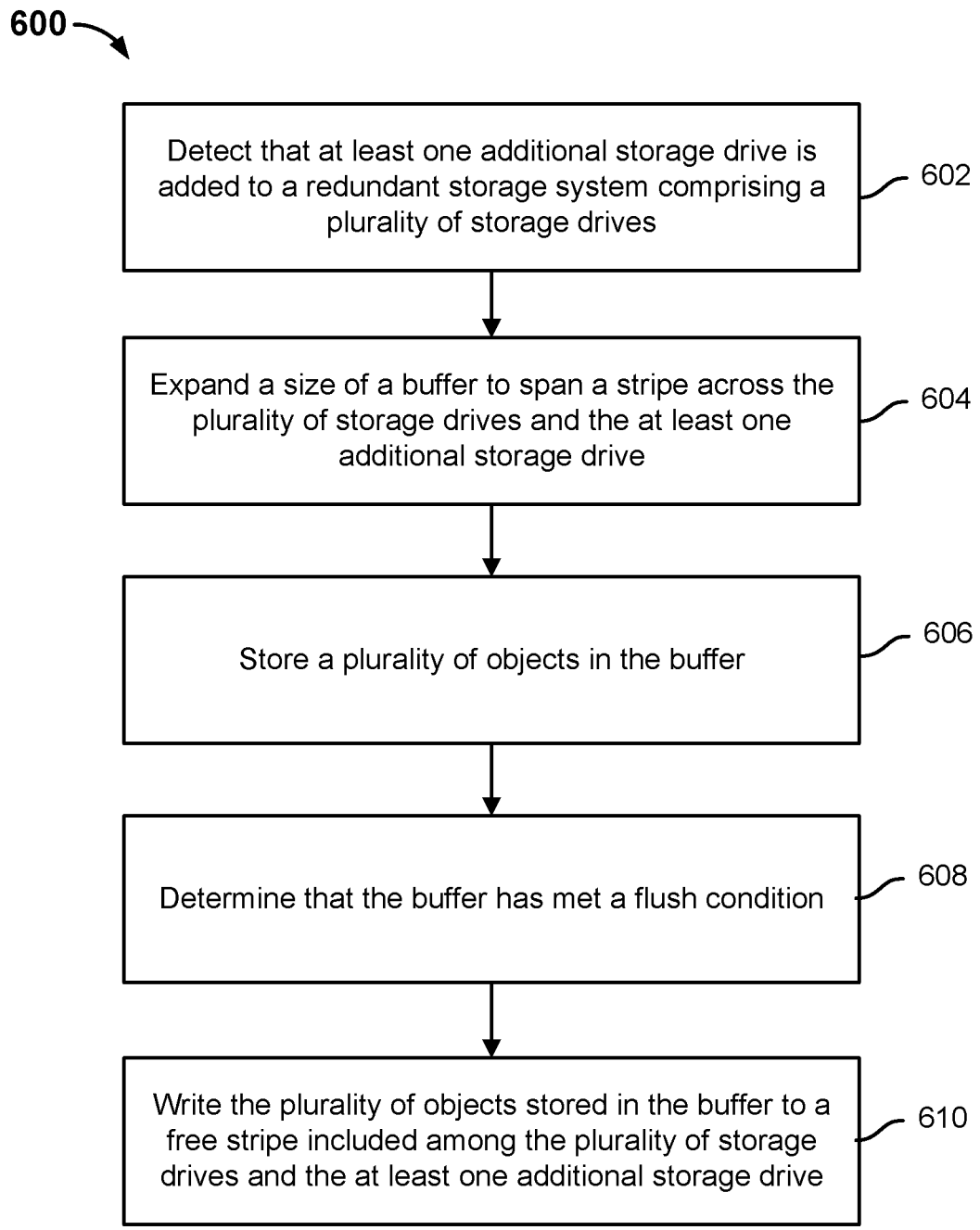
FIG. 6 is a flow diagram showing an embodiment of a process for writing to stripes of an expanded redundant storage system.

FIG. 6 is a flow diagram showing an embodiment of a process for writing to stripes of an expanded redundant storage system. In some embodiments, process 600 may be implemented by using RAID layer 102 of FIG. 1.

At 602, it is detected that at least one additional storage drive is added to a redundant storage system comprising a plurality of storage drives. The expansion of a RAID group with the addition of one or more new storage drives is detected.

At 604, a size of a buffer is expanded to span a stripe across the plurality of storage drives and the at least one additional storage drive. In response to the detection of the expansion of the RAID group, the size of at least one in-memory buffer is expanded to match the size of an expanded stripe of the RAID group. For example, prior to the expansion, the RAID group included M storage drives and therefore had stripes that were each M stripe units in width. After the RAID group is expanded by k additional storage drives, the stripes each become M+k stripe units in width. Each in-memory buffer is configured to store data that is to be flushed to (i.e., written to) a free (unused) stripe of the RAID group in response to a flush condition being met (e.g., at least a threshold percentage of the capacity of the in-memory buffer is full of data).

At 606, a plurality of objects is stored in the buffer. Depending on the type of data that the in-memory buffer is configured to store, different types of objects (assuming a log structured object store is built on top of the RAID system), may be stored in the in-memory buffer. In some embodiments, the in-memory buffer is configured to store new user data that are received from one or more read requests. In some embodiments, the in-memory buffer is configured to store live/current versions of objects that are being moved by a garbage collection mechanism from their source stripes to a new target stripe. In some embodiments, the in-memory buffer is configured to store a combination of new user data and also live/current versions of objects that are being moved by a garbage collection mechanism.

At 608, it is determined that the buffer has met a flush condition. In various embodiments, a flush condition refers to a condition that upon being met by the in-memory buffer, the content of the in-memory buffer will be flushed (written) to a free stripe in the RAID group. An example of the flush condition is that the in-memory buffer is at least a threshold percentage of its capacity is filled with data.

At 610, the plurality of objects stored in the buffer is written to a free stripe included among the plurality of storage drives and the at least one additional storage drive. After the in-memory buffer meets the flush condition, then its contents are written to a free, target stripe of the RAID group. Because the in-memory buffer has already been expanded in size to accommodate the current width a stripe in the RAID group, the flushing of the in-memory buffer will cause valid data to be written to each stripe unit (storage drive) within the target stripe. After the in-memory buffer has been flushed, its contents can be overwritten with new data.

Figure 7:
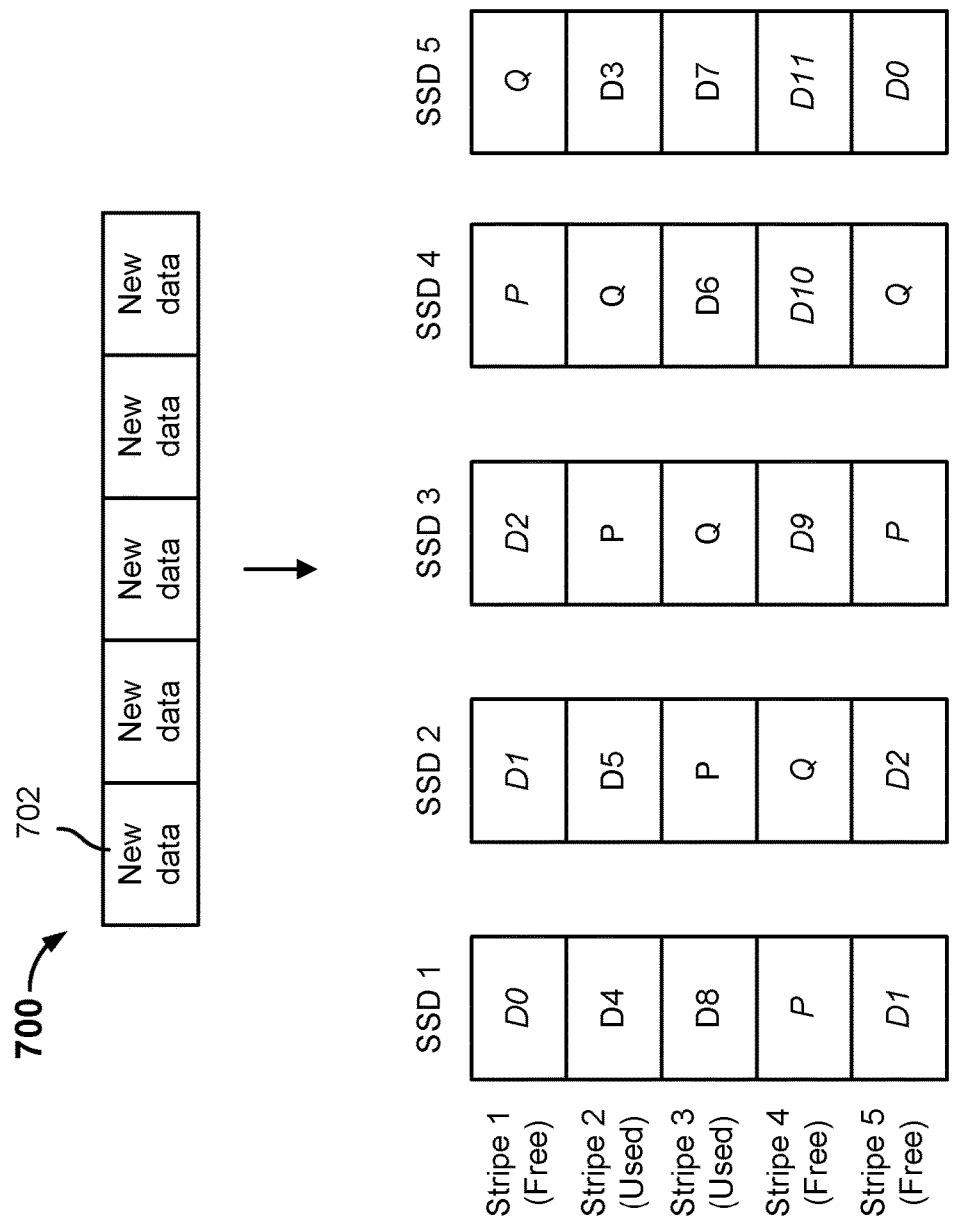
FIG. 7 shows an example of a buffer that is used to store data to be written to a stripe of a redundant storage system prior to an expansion of the redundant storage system.

FIG. 7 shows an example of a buffer that is used to store data to be written to a stripe of a redundant storage system prior to an expansion of the redundant storage system. In the example, buffer 700 comprises a buffer that is maintained in memory. Because there are currently five physical storage drives in the RAID group (that includes storage drives D1, D2, D3, D4, and D5), buffer 700 currently has a width of five stripe units, where each stripe units is represented as a box, such as box 702. The data stored in each stripe unit portion of buffer 700 is to be written to a corresponding storage drive of the RAID group at the target stripe. In response to detecting that buffer 700 has met a flush condition (e.g., buffer 700 is at least a threshold percentage of its capacity is filled with data), the data stored in buffer 700 is written to a free stripe of the RAID group. In the example of FIG. 7, Stripe 1, Stripe 4, and Stripe 5 are each free stripes so any one of Stripe 1, Stripe 4, and Stripe 5 may be selected to be written to by the content of buffer 700. In the example of FIG. 7, each stripe stores parity data in two storage drives and so after three stripe units of buffer 700 are written to with new user data, two stripe units of parity data may be determined based on the three stripe units of user data, thereby completing the five stripe units worth of data in buffer 700.

Figure 8:
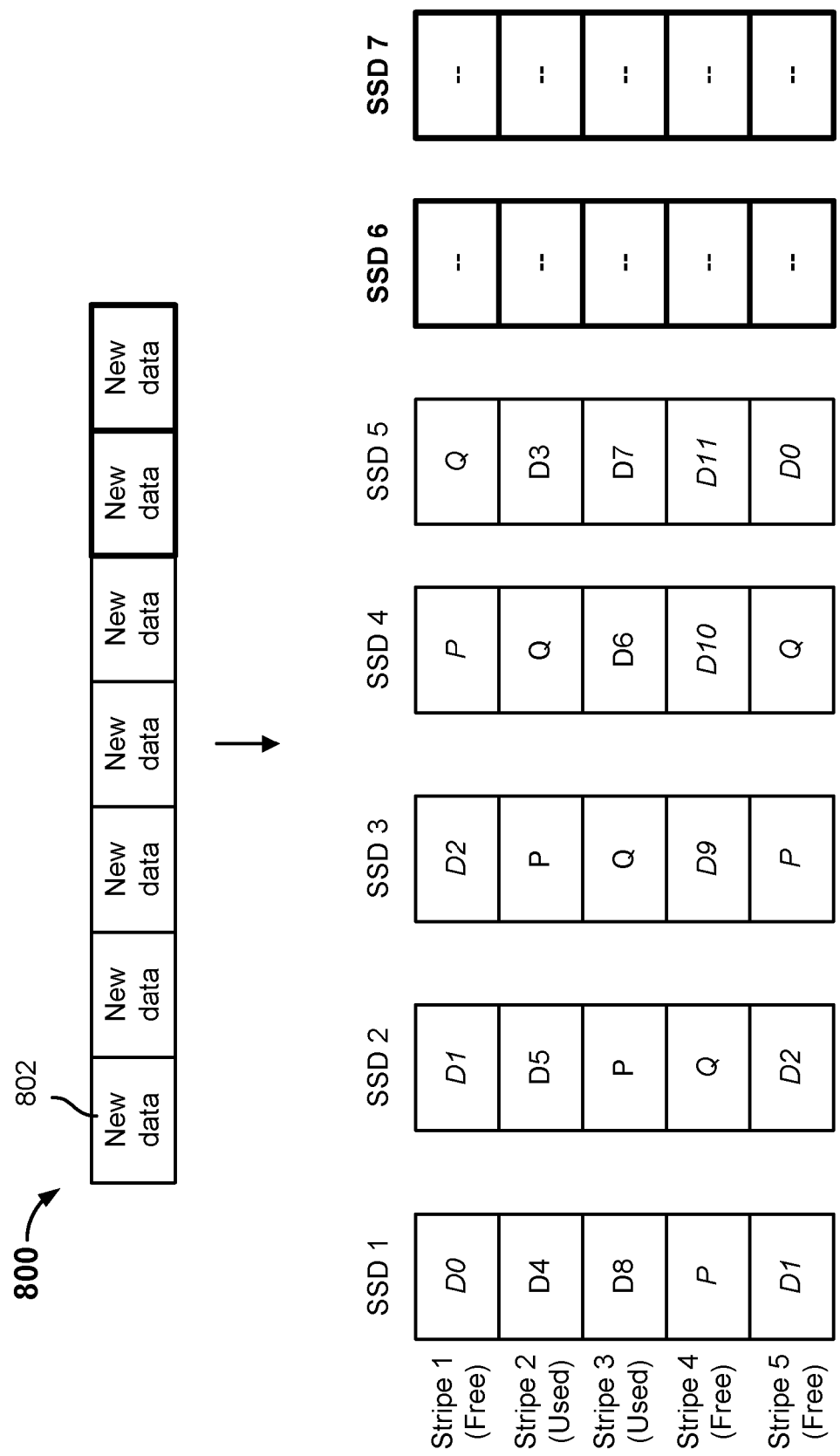
FIG. 8 shows an example of a buffer that is used to store data to be written to a stripe of a redundant storage system after an expansion of the redundant storage system.

FIG. 8 shows an example of a buffer that is used to store data to be written to a stripe of a redundant storage system after an expansion of the redundant storage system. In the example, buffer 800 comprises a buffer that is maintained in memory. The RAID group that was shown in FIG. 7 has since been expanded with two additional storage drives, SSD6 and SSD7. As a result of the expansion, each stripe of the RAID group now includes seven stripe units (instead of just five) and buffer 700 of FIG. 7 that previously was five stripe units in width has since been expanded to being seven stripe units in width. Given that buffer 800 has been expanded, it can now collect more data than before the expansion. The data stored in each stripe unit portion (e.g., box 802) of buffer 800 is to be written to a corresponding storage drive of the RAID group at the target stripe. In response to detecting that buffer 800 has met a flush condition (e.g., buffer 800 is at least a threshold percentage of its capacity is filled with data), the data stored in buffer 800 is written to a free stripe of the RAID group. In the example of FIG. 8, Stripe 1, Stripe 4, and Stripe 5 are each free stripes so any one of Stripe 1, Stripe 4, and Stripe 5 may be selected to be written to by the content of buffer 800. Assuming that both storage drives SSD 6 and SSD7 store user data, each expanded stripe stores parity data in two storage drives and so after five stripe units of buffer 800 are written to with new user data, two stripe units of parity data may be determined based on the five stripe units of user data, thereby completing the five stripe units worth of data in buffer 800.

Figure 9:
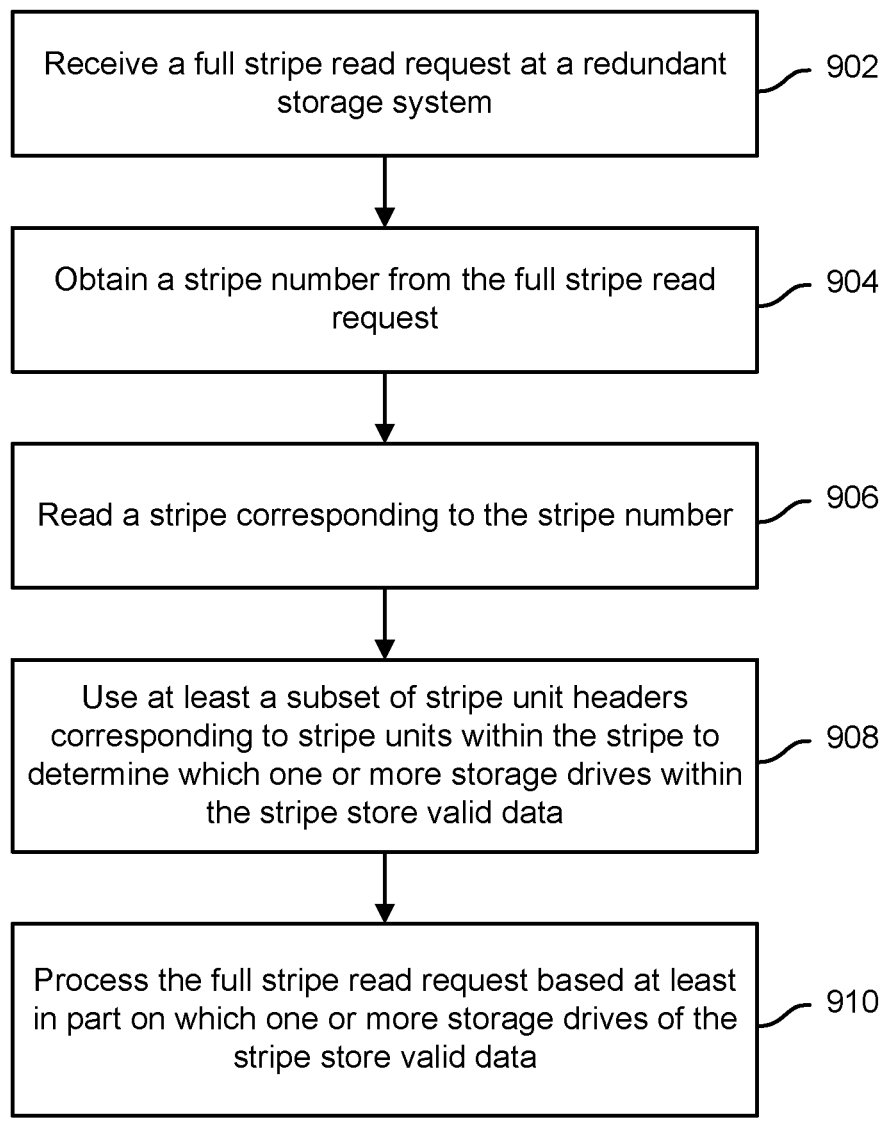
FIG. 9 is a flow diagram showing an example of a process for completing a full stripe read request.

In various embodiments, there are two ways in which data is read from a stripe: either the full stripe is read, or one or more individual objects are read from within a stripe. FIG. 9, below, shows an example process of performing a full stripe read. FIGS. 10 through 15 describe examples related to performing an object read.

FIG. 9 is a flow diagram showing an example of a process for completing a full stripe read request. In some embodiments, process 900 may be implemented by using RAID layer 102 of FIG. 1.

At 902, a full stripe read request is received at a redundant storage system. In some embodiments, a full stripe read request is received at a RAID group from an application. Full stripe read requests could be made for different purposes. One is to "scrub" existing data that is stored in the system to find errors that may have crept in over time and correct them. This could involve reading the whole stripe including parity, checking the parity, and checking the checksums of all data objects stored in the stripe. Another reason for reading a whole stripe is during garbage collection, where all the data in a source stripe is read and only the live portions of the data are copied and forwarded into a free target stripe.

At 904, a stripe number is obtained from the full stripe read request. The full stripe read request includes at least a stripe number.

At 906, a stripe corresponding to the stripe number is read. The entire stripe associated with the stripe number that was specified in the full stripe read request is read from the storage drives of the RAID group. In the case of the full stripe read, the entire stripe is first read based on the assumption that all the stripe units within the stripe contain valid data.

At 908, at least a subset of stripe unit headers corresponding to stripe units within the stripe is used to determine which one or more storage drives within the stripe store valid data. The stripe unit headers corresponding to at least a subset of stripe units within that stripe are read to determine which stripe units within that stripe store valid data and which do not (e.g., as a result of a recent expansion of the RAID group).

In some embodiments, all available stripe unit headers of the stripe are read. A stripe unit that does not store valid data (because it is part of a newly added drive to which valid data has not yet been written) does not include a stripe unit header. As such, by reading all the available stripe unit headers in a stripe, it can be inferred which drives store valid data and which drives do not store valid data in that stripe.

In some embodiments, a predetermined number of stripe unit headers of the stripe are read. Because each stripe unit header includes information such as which stripe the stripe unit belongs to and also how many drives store valid data in that stripe at the time that the stripe unit was written, in some embodiments, if the predetermined number of stripe unit headers of the stripe contain consistent information, then it is presumed that the consistent information is accurate and that the remaining stripe unit headers of the other stripe units, if any, do not need to be read. For example, the predetermined number of stripe unit headers to read may be the original number of drives in the original RAID group. By reading only a predetermined number of stripe unit headers in a stripe even if the stripe includes additional stripe unit headers that will not be read, the check for the number of drives that store valid data in that stripe is made more efficient than having to read all stripe unit headers of the stripe. Because each subsequently added storage drive to a RAID group is associated with a physical storage drive identifier that denotes the chronological order in which the storage drive was added to the RAID group, if it is determined that five out of seven drives in the RAID group store valid data in the stripe, for example, then the first five drives that were part of the RAID group are determined to store valid data in that stripe.

At 910, the full stripe read request is processed based at least in part on which one or more storage drives of the stripe store valid data. The information of which stripe units within that stripe store valid data and which do not may be used to extract the portion of the entire stripe worth of data that was read that actually contains valid data.

Figure 10:
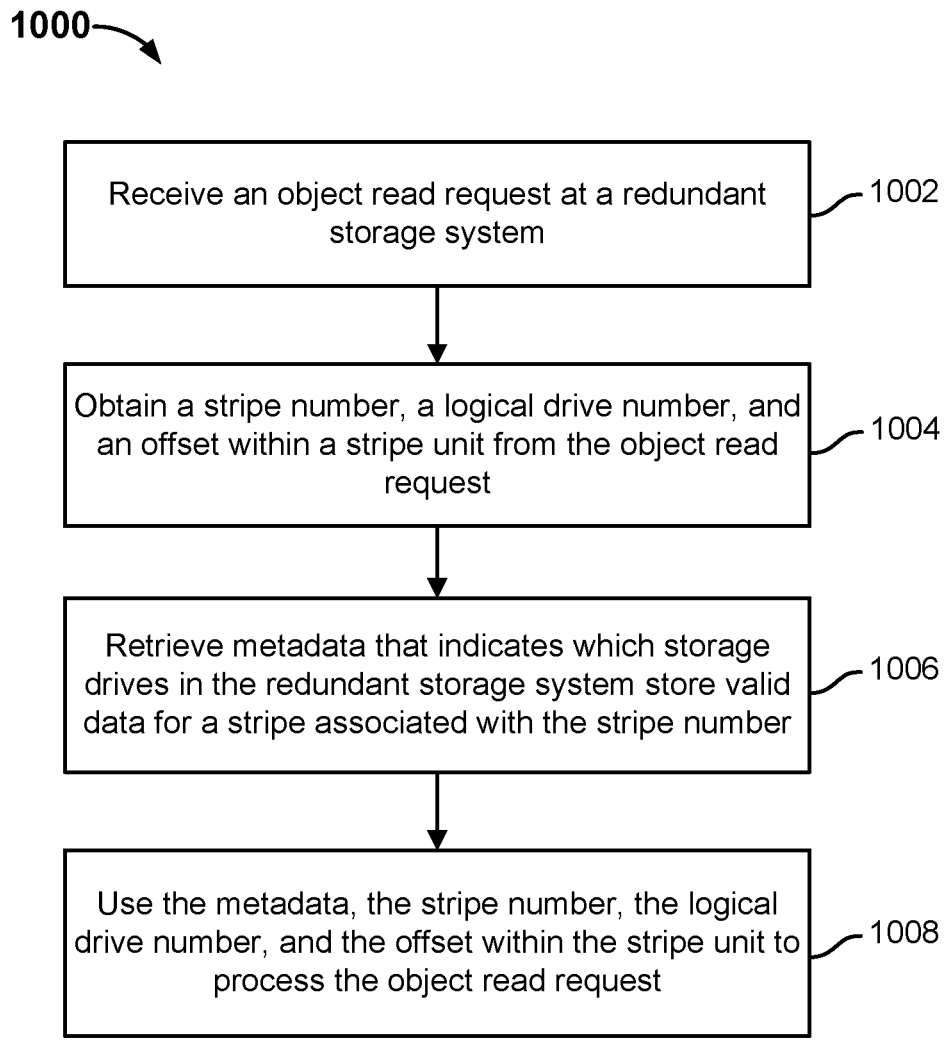
FIG. 10 is a flow diagram showing a first example of a process for completing an object read request.

FIG. 10 is a flow diagram showing a first example of a process for completing an object read request. In some embodiments, process 1000 may be implemented by using RAID layer 102 of FIG. 1.

Process 1000 is an example process for obtaining metadata that indicates which storage drives in a RAID group store valid data for a stripe to complete an object read request that is received at a RAID group that employs parity rotation.

Specifically, process 1000 describes techniques of persisting metadata (e.g., in volatile or non-volatile storage) that indicates which storage drives in a RAID group store valid data for a stripe.

At 1002, an object read request is received at a redundant storage system. An object may be requested to be read for various reasons. For example, when users of the filesystem request data to be read, it may result in one or more reads of particular objects in the log-structured object store. Also, there may be reads generated internally by different modules of the filesystem for various bookkeeping tasks, or to check validity of certain objects stored in the system. Additionally, when users try to write blocks that partially span existing data blocks, then the filesystem may need to read existing blocks, modify them, and write them back; this could be another source of reads.

At 1004, a stripe number, a logical drive number, and an offset within a stripe unit are obtained from the object read request. In some embodiments, the object read request includes at least an identifier associated with a RAID group (if there are multiple RAID groups), a size of the requested object, a stripe number, a logical drive number, and an offset within a stripe unit that are extractable and also usable to identify the desired data (e.g., individual objects).

In various embodiments, the information (e.g., a stripe number, a logical drive number, and an offset within a stripe unit) included in the object read request is at least a portion of the requested object's metadata (e.g., address). The requested object's address (which becomes the parameters of the object read request) may be obtained by sender of an object read request (e.g., a filesystem module) using the following example technique: The object addresses for data blocks may be stored in filesystem metadata. All metadata in the system is ultimately also stored in objects in the object store. This metadata is organized usually as a tree of some sort with a root; when the system is brought up initially (or after a crash), only the root of this metadata hierarchy would need to be accessed initially from the root, which would allow all other parts of the metadata "tree" to be reached by successively traversing nodes down the tree. Thus, all that is needed by a sender of an object read request when the filesystem is started is the address of one or more "root" objects; these can be obtained, for example, by searching stripes in the RAID group for these objects, or by looking at some of the most recently written stripes.

At 1006, metadata that indicates which storage drives in the redundant storage system store valid data for a stripe associated with the stripe number is retrieved. When the RAID scheme used by the RAID group of storage drives involves parity rotation, the physical storage drive containing an object may be different from the logical drive number obtained from the object read request. Because of this, metadata is used to identify which stripe units within the stripe associated with the object read request stores valid data. FIGS. 11 through 14, below, describe various example techniques by which such metadata is determined and/or stored/updated.

At 1008, the metadata, the stripe number, the logical drive number, and the offset within the stripe unit are used to process the object read request. The metadata that indicates which stripe units within the stripe associated with the object read request store valid data may be used to correctly map/translate the information included in the object read request to the appropriate storage drive (stripe unit) of the stripe such that the correct data (e.g., individual objects) stored within that stripe unit could be retrieved and returned to the requesting entity.

Usually, the parity rotation works in the following manner: for each successive stripe, the drives on which the parity is located are moved by one drive (to the left or right), with circular wraparound. This allows a simple math formula to be used to determine which logical drive maps to which physical drive. Assume that an object read request requests to access logical drive number X at stripe S. When stripe S was written, assume that it had N drives (i.e., N drives store valid data in stripe Y). Then logical drive numbers N−1 and N−2 would contain the parity P and Q (assuming RAID-6), and the remainder of the drives would contain data. If S=0, then the logical drive number would be identical to the physical drive number. For the next stripe S=1, logical drive number 0 could be at physical drive number 1, logical drive number 1 would be at physical drive number 2, and so on, and finally logical drive number N−1 would be at physical drive number 0 (because of circular wraparound). Following this logic, the physical drive number corresponding to a logical drive number may be determined using the following example formula:

$$P=(L+S)\% N \qquad (1)$$

Where P is the physical drive number, L is the logical drive number, % is the modulo (i.e., remainder when divided by N) operator, S is the stripe number, and N is the number of drives that store valid data in stripe S.

Note that three pieces of information are needed to find the physical drive number, P, to read from to complete an object read request: L, S, and N. L and S are both obtained from the address of the object (parameters of the object read request). In a system without expansion capability, N is always fixed. But in expanded systems, N can be different for different stripes, so N may be determined for different stripes. The obtained metadata that indicates which stripe units within a stripe store valid data as described herein describes the current N value of each stripe of a RAID group.

Figure 16:
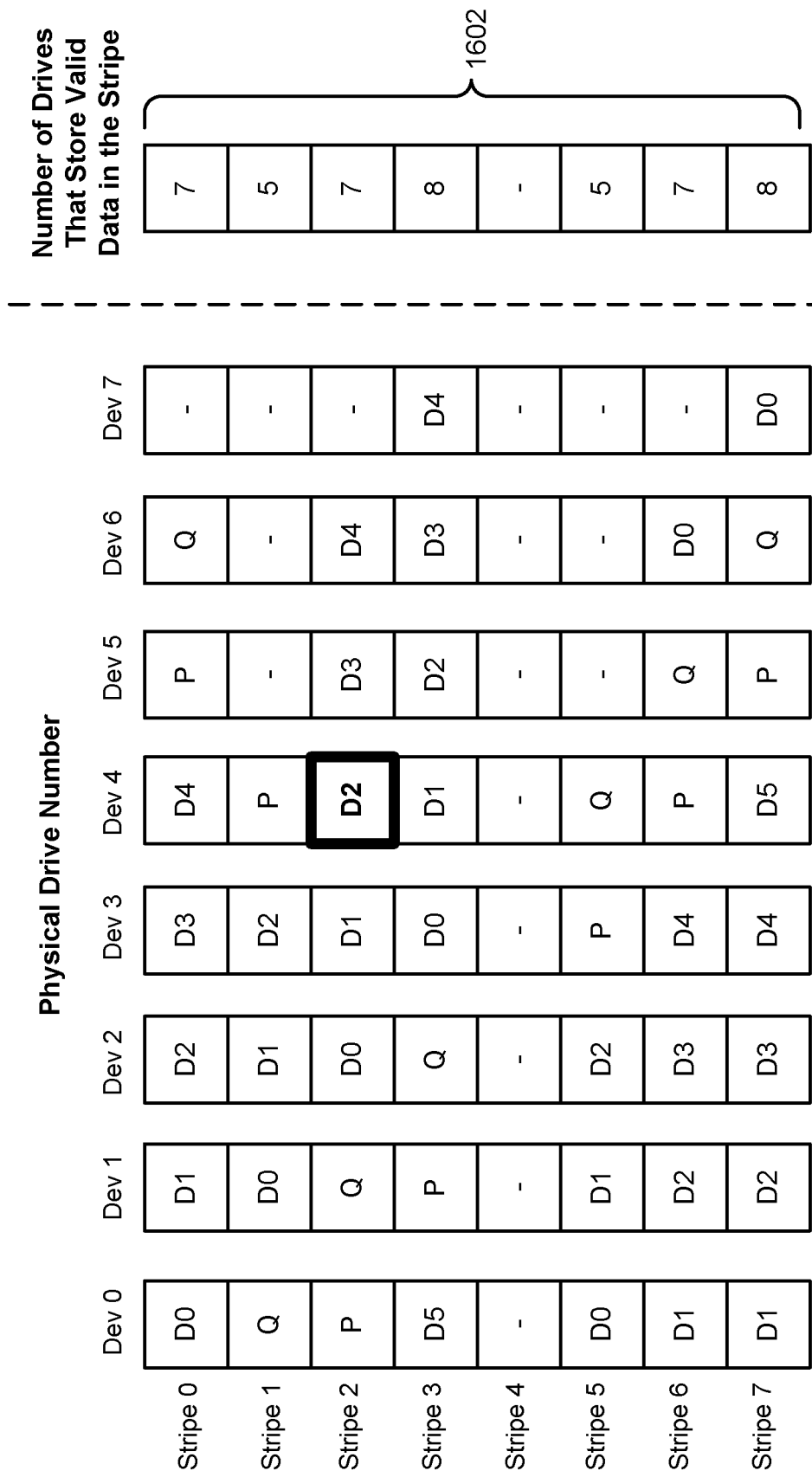
FIG. 16 is a diagram showing an example of an RAID group using parity rotation that has been incrementally expanded.

Examples of using the obtained metadata of which stripe units within the stripe associated with the object read request stores valid data to process an object read request received at a RAID group that uses parity rotation are shown in FIG. 16, below.

In some embodiments, it can be recorded in the RAID layer that a RAID group has never been expanded beyond the original number of storage drives in the group. In this case, the metadata of which stripe units within the stripe associated with the object read request stores valid data need not be obtained and it is presumed that each stripe of the RAID group includes valid data in each of the original storage drives of the RAID group. Therefore, if parity rotation were employed by the RAID group and it has been recorded in the RAID layer that a RAID group has never been expanded beyond the original number of storage drives in the group, in determining the physical drive number relevant to an object read request, the value of N in formula (1) would be fixed at the original number of drives in the group, regardless of which stripe (S) the object read request is to be read from.

In the event that the RAID scheme used by the RAID group of storage drives does not involve parity rotation, then the logical drive number parameter can be mapped directly to the corresponding physical drive number to complete the object read request, without needing to obtain or use the metadata of which stripe units within the stripe associated with the object read request stores valid data. Put another way, to complete an object read request for a RAID group that does not employ parity rotation, step 1006 can be skipped and the object read request can be processed with the stripe number, the logical drive number, and the offset within a stripe unit that were obtained from the object read request.

Figure 11:
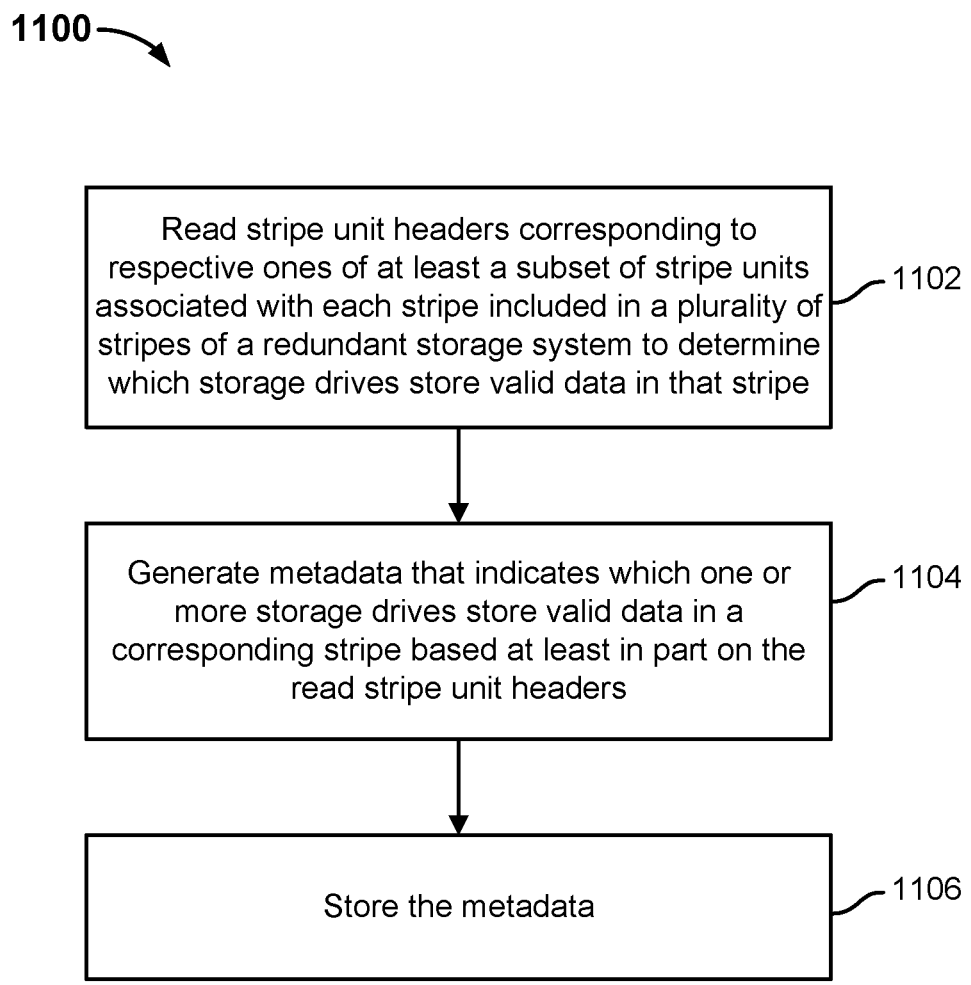
FIG. 11 is a flow diagram showing an example of a process for generating metadata that indicates which storage drives store valid data in a corresponding stripe of a redundant storage system.

FIG. 11 is a flow diagram showing an example of a process for generating metadata that indicates which storage drives store valid data in a corresponding stripe of a redundant storage system. In some embodiments, process 1100 may be implemented by using RAID layer 102 of FIG. 1.

At 1102, stripe unit headers corresponding to respective ones of at least a subset of stripe units associated with each stripe included in a plurality of stripes of a redundant storage system are read to determine which storage drives store valid data in that stripe. The stripe unit headers of at least a subset of the stripe units that are included in each stripe of the RAID group are read. In some embodiments, the reading of at least a subset of the stripe units that are included in each stripe of the RAID group is performed in response to a startup of the RAID system.

In some embodiments, all available stripe unit headers of the stripe are read. A stripe unit that does not store valid data (because it is part of a newly added drive to which valid data has not yet been written) does not include a stripe unit header. As such, by reading all the available stripe unit headers in a stripe, it can be inferred which drives store valid data and which drives do not store valid data in that stripe.

In some embodiments, a predetermined number of stripe unit headers of the stripe are read. Because each stripe unit header includes information such as which stripe the stripe unit belongs to and also how many drives store valid data in that stripe at the time that the stripe unit was written, in some embodiments, if the predetermined number of stripe unit headers of the stripe contain consistent information, then it is presumed that the consistent information is accurate and that the remaining stripe unit headers of the other stripe units, if any, do not need to be read. For example, the predetermined number of stripe unit headers to read may be the original number of drives in the original RAID group. By reading only a predetermined number of stripe unit headers in a stripe even if the stripe includes additional stripe unit headers that will not be read, the check for the number of drives that store valid data in that stripe is made more efficient than having to read all stripe unit headers of the stripe. Because each subsequently added storage drive to a RAID group is associated with a physical storage drive identifier that denotes the chronological order in which the storage drive was added to the RAID group, if it is determined that five out of seven drives in the RAID group store valid data in the stripe, for example, then the first five drives that were part of the RAID group are determined to store valid data in that stripe.

The cost of reading the stripe unit headers on an object read request is made cheap on solid state drives (SSDs). Since the cost of a random read on a SSD is much lower than hard disk drives (HDDs), this cost is much lower on a SSD-based storage system, as opposed to a HDD-based storage system.

At 1104, metadata that indicates which one or more storage drives store valid data in a corresponding stripe is generated based at least in part on the read stripe unit headers. In some embodiments, the metadata comprises a table that stores data indicating whether each storage drive (stripe unit) within a stripe stores valid data or does not store valid data.

At 1106, the metadata is stored. In some embodiments, the metadata (e.g., a table) is stored at volatile storage (e.g., memory) so that it can be quickly accessed. In some embodiments, the metadata is stored at non-volatile storage (e.g., NVRAM) so that it can be recovered after a system crash.

For example, if each new object read request also has to read the stripe unit header, then the operation becomes prohibitively expensive. However, if only the first object read request to the stripe needs to pay this cost then it is quite cheap. Future object read requests can just take advantage of the table in the memory.

FIG. 12A is a first example of a table that stores data indicating how many storage drives (stripe units) within a stripe store valid data. In the example of FIG. 12A, a RAID group currently includes Physical Drives SSD1 through SSD7. In the example, each stripe unit (a stripe unit is identified by a physical drive number and also a stripe number, e.g., stripe unit 1202 may be identified as the stripe unit at Physical Drive SSD7 and Stripe 3) is associated with either a "1," which indicates that the stripe unit stores valid data, or "0," which indicates that the stripe unit does not store valid data, in the table. Stripe 1 stores valid data in Physical Drives SSD1 through SSD 3, Stripe 2 stores valid data in Physical Drives SSD1 through SSD 7, Stripe 3 stores valid data in Physical Drives SSD1 through SSD 5, Stripe 4 stores valid data in Physical Drives SSD1 through SSD 7, and Stripe 5 stores valid data in Physical Drives SSD1 through SSD 5. As such, a table such as the table of FIG.

12A keeps track of which stripe units of which stripes of a RAID group stores valid data. In various embodiments, because incremental expansions of a RAID group is permitted and because stripes are opportunistically written to, different stripes may concurrently store valid data in a different number of storage drives (stripe units). As mentioned above, newly written stripes always span all storage drives currently present within the RAID group at the time that the stripes were written. As a result, depending on when a stripe was written to, the data included in the write may span a different number of storage drives (stripe units). It can be inferred from the table that the RAID group originally included Physical Drives 1 through 3, which is why Stripe 1 includes valid data in only Physical Drives 1 through 3. It can be inferred from the table that the RAID group was then expanded a first time from three physical storage drives (Physical Drives 1 through 3) to include two additional physical storage drives (Physical Drives 4 and 5), which is why Stripes 3 and 5 each includes valid data in Physical Drives 1 through 5. It can be inferred from the table that the RAID group was then expanded a second time from five physical storage drives (Physical Drives 1 through 5) to include another two additional physical storage drives (Physical Drives 6 and 7), which is why Stripes 2 and 4 each includes valid data in Physical Drives 1 through 7.

FIG. 12B is a second example of a table that stores data indicating how many storage drives (stripe units) within a stripe store valid data. The data structure (table) in FIG. 12B stores a more compact version of the same information that is stored in the example table of FIG. 12A. Rather than indicating which specific drives store valid data in a stripe, the table in the example of FIG. 12B merely stores the number of drives that store valid data in each stripe. Which specific drives store valid data in each stripe can be inferred using the stored the number of drives that store valid data in each stripe because physical drives in a RAID group are associated with numbers that increases (or otherwise) denotes a chronological order in which the drives were added to the RAID group. For example, each later added storage drive is associated with a physical drive number that is greater than a previously added or originally existing storage drive of the RAID group. For example, because the table indicates that three drives store valid data in Stripe 1, then it is determined that the first three physical drives of the RAID group, Physical Drives 1 through 3, store valid data. Similarly, for example, because the table indicates that seven drives store valid data in Stripe 2, then it is determined that the first seven physical drives of the RAID group, Physical Drives 1 through 7, store valid data.

Figure 13:
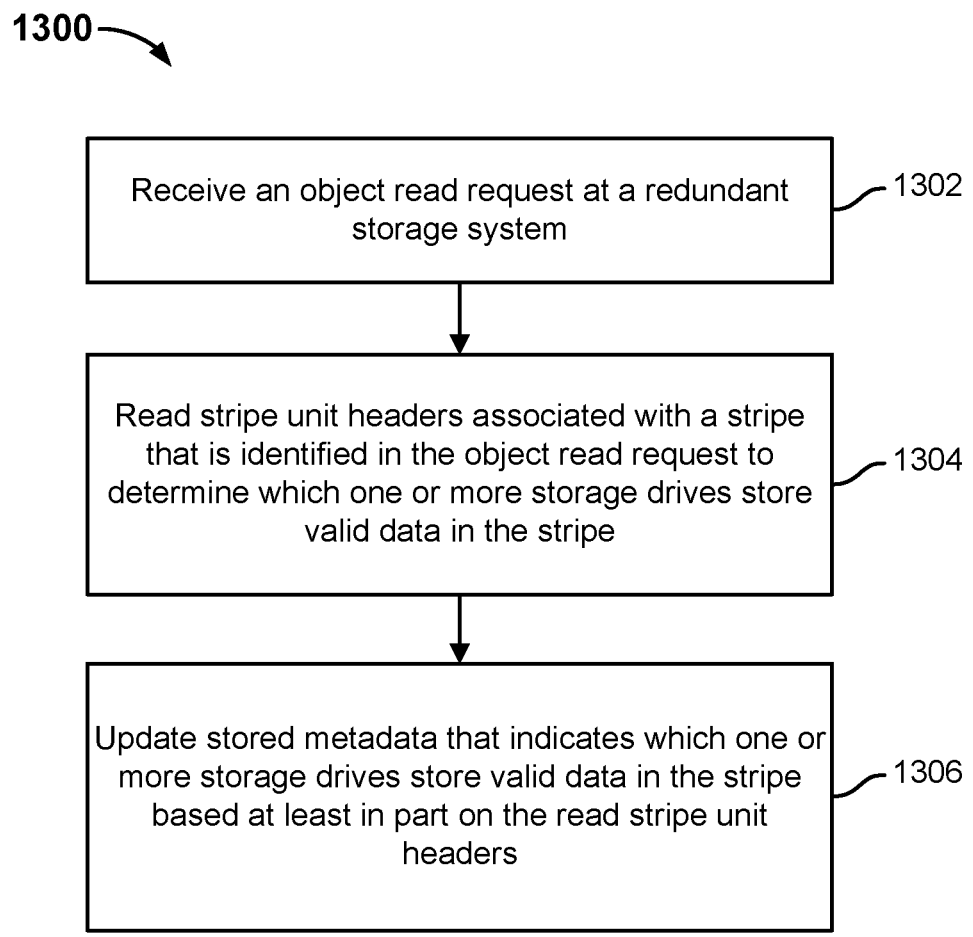
FIG. 13 is a flow diagram showing a first example of a process for updating metadata that indicates which storage drives store valid data in a corresponding stripe of a redundant storage system.

FIG. 13 is a flow diagram showing a first example of a process for updating metadata that indicates which storage drives store valid data in a corresponding stripe of a redundant storage system. In some embodiments, process 1300 may be implemented by using RAID layer 102 of FIG. 1.

Process 1300 describes an example process of updating stored metadata such as metadata that was created by a process such as process 1100 of FIG. 11. In some embodiments, process 1300 may be implemented for updating metadata that is stored in a storage medium that permits in-place updates.

At 1302, an object read request is received at a redundant storage system. The object read request includes at least a stripe number, a logical drive number, and an offset within a stripe unit that are usable to identify the desired data (e.g., individual objects).

At 1304, stripe unit headers associated with a stripe that is identified in the object read request are read to determine which one or more storage drives store valid data in the stripe. In response to the received object read request, the stripe unit headers of at least a subset of stripe units that are included in the stripe whose stripe number is specified in the object read request are read to determine the current storage drives (stripe units) that store valid data in that particular stripe. Example techniques for reading stripe units are described above.

At 1306, stored metadata that indicates which one or more storage drives store valid data in the stripe is updated based at least in part on the read stripe unit headers. The stored metadata is updated, if appropriate, with the information that was recently read from the stripe unit headers.

In some embodiments, stored metadata that indicates which one or more storage drives store valid data in the stripe may also be updated following a completed stripe write request. For example, the metadata could be updated to indicate how many drives store valid data in the stripe to which the write request was performed.

In some embodiments, the metadata that indicates which one or more storage drives store valid data in the stripe is not stored in any type of storage medium and so just steps 1302 and 1304 of process 1300 may be performed to determine the number of drives in a given stripe on demand, without necessarily resulting in an update to previously stored metadata.

In some embodiments, in the event that the metadata that indicates which one or more storage drives store valid data in the stripe had been stored in volatile storage (e.g., memory) but the system and crashed, which resulted in the loss of the metadata in memory, it may take some time before the metadata is completely rebuilt in memory. In that case, steps 1302 and 1304 of process 1300 may be performed to determine the number of drives in a given stripe on demand and step 1306 may be optionally performed to update the metadata that is being rebuilt in memory.

Figure 14:
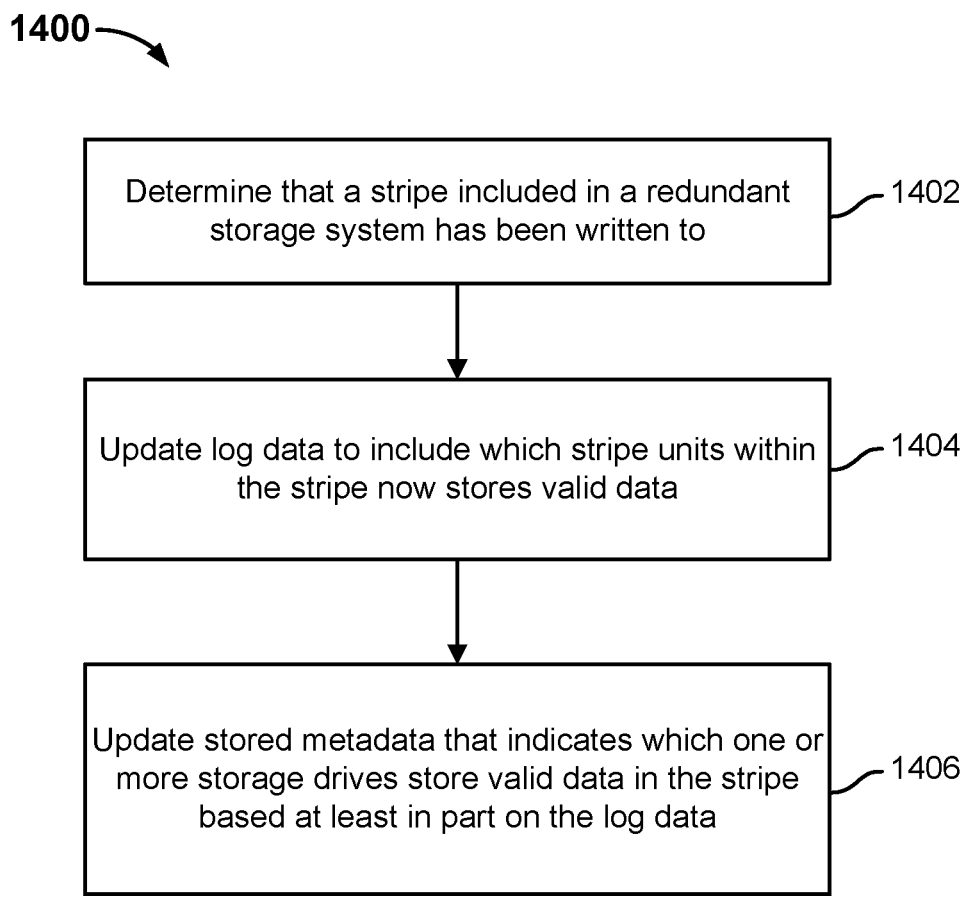
FIG. 14 is a flow diagram showing a second example of a process for updating metadata that indicates which storage drives store valid data in a corresponding stripe of a redundant storage system.

FIG. 14 is a flow diagram showing a second example of a process for updating metadata that indicates which storage drives store valid data in a corresponding stripe of a redundant storage system. In some embodiments, process 1400 may be implemented by using RAID layer 102 of FIG. 1.

Process 1400 describes another example process of updating stored metadata such as metadata that was created by a process such as process 1100 of FIG. 11. In some embodiments, process 1400 comprises a checkpoint-based technique of updating stored metadata and may be implemented for updating metadata that is stored in a storage medium that does not permit in-place updates.

At 1402, it is determined that a stripe included in a redundant storage system has been written to. An entire (all stripe units of a) free stripe of the RAID group has been written to.

At 1404, log data is updated to include which stripe units within the stripe now stores valid data. Which stripe units of the written to stripe now stores valid data is logged (e.g., in non-volatile storage). In various embodiments, each time a stripe in the RAID group is written to after the generation of the metadata, which stripe units were written to within that stripe is logged.

At 1406, stored metadata that indicates which one or more storage drives store valid data in the stripe is updated based at least in part on the log data. Because the updates to the stored metadata has been logged, at an event in which the stored metadata may be written to a new location in the storage medium (e.g., because in-place updates are not available), the logged data may be merged into the most recent version of the metadata. For example, after the RAID system crashes and upon restart of the RAID system, the stored metadata may be read and then written to a new location in the storage medium including by modifying the previous version of the metadata with any changes that are reflected by the logged data.

Figure 15:
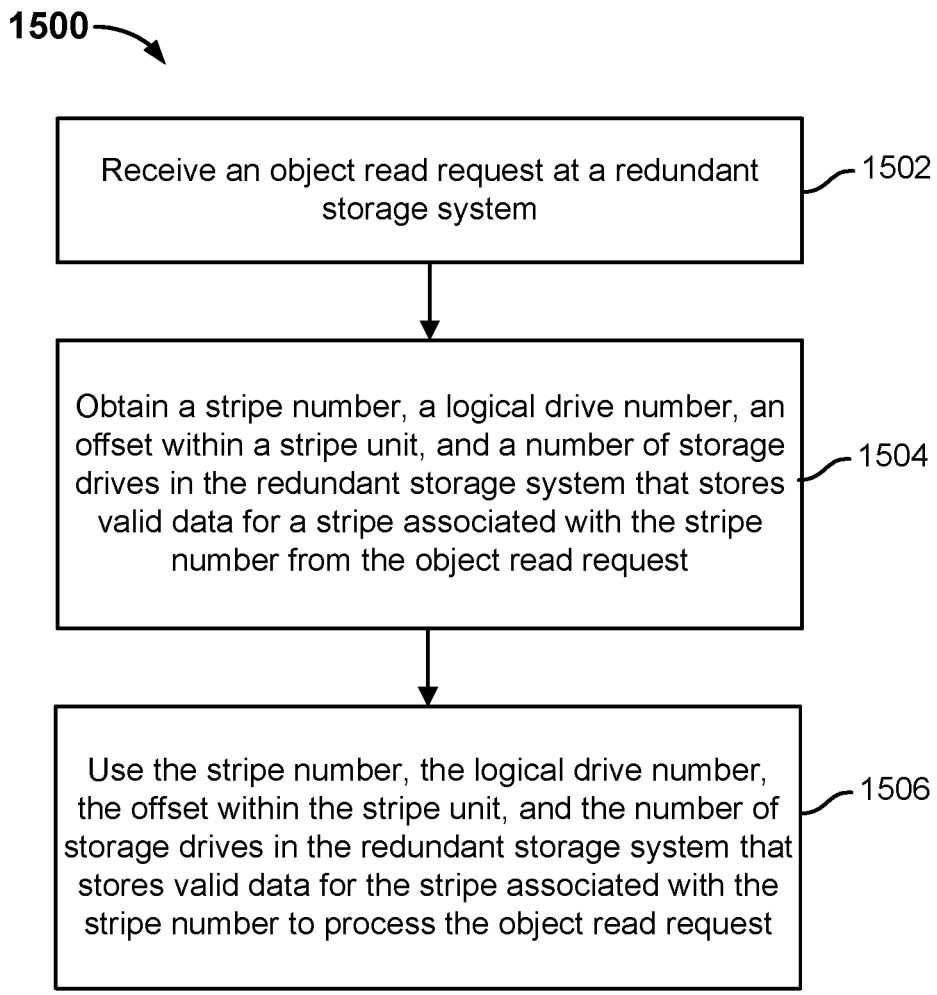
FIG. 15 is a flow diagram showing a second example of a process for completing an object read request.

FIG. 15 is a flow diagram showing a second example of a process for completing an object read request. In some embodiments, process 1500 may be implemented by using RAID layer 102 of FIG. 1.

Process 1500 is another example process for obtaining metadata that indicates which storage drives in a RAID group store valid data for a stripe to complete an object read request that is received at a RAID group that employs parity rotation.

Specifically, instead of persisting metadata (e.g., in volatile or non-volatile storage) that indicates which storage drives in a RAID group store valid data for a stripe, process 1500 describes an example of embedding the number of storage drives (storage units) that store valid data in the stripe in which an object is stored directly in that object's metadata (e.g., address). That way, whenever an object read request is received, the number of storage drives (storage units) that store valid data in the stripe in which an object is stored is obtained by simply extracting the information from the received object read request.

At 1502, an object read request is received at a redundant storage system.

At 1504, a stripe number, a logical drive number, an offset within a stripe unit, and a number of storage drives in the redundant storage system that stores valid data for a stripe associated with the stripe number are obtained from the object read request. The requested object's address (which becomes the parameters of the object read request) may be obtained by a sender of an object read request (e.g., a filesystem module) may be obtained using the example technique described above. Because the number of storage drives in the RAID group that stores valid data for the stripe associated with the stripe number is encoded in each object's metadata (e.g., address), which is included in the received object read request, there is no need to persist such metadata (e.g., the example tables shown in FIGS. 12A and 12B) in volatile or non-volatile storage or read stripe unit headers. As such, process 1500 may be used alternatively to the example techniques of FIGS. 10 through 14. However, encoding the number of storage drives in the RAID group that stores valid data for the stripe in which an object is stored in the object's address may incur some additional overhead in writing the object's address in the filesystem.

At 1506, the stripe number, the logical drive number, the offset within the stripe unit, and the number of storage drives in the redundant storage system that stores valid data for the stripe associated with the stripe number are used to process the object read request. Example techniques of mapping an object read request to the correct physical drive number are described above.

In various embodiments, the physical drive number in which an object is stored is not encoded in the object's metadata (e.g., address) because that information is not known at the time an acknowledgement for having successfully stored the object is returned to the sender of the object write request. This is because (e.g., in a log-structured system), newly written objects are collected in an in-memory buffer until the buffer is ready to be flushed, at which the buffered objects are actually written to physical drives. As such, after a new object is written to the buffer, only a logical drive number is returned to the requestor in the acknowledgement of the write and stored in the object's address because which physical drive to which the object will be flushed is not yet known.

Examples of using the obtained metadata of which stripe units within the stripe associated with the object read request stores valid data to process an object read request received at a RAID group that uses parity rotation are shown in FIG. 16, below.

FIG. 16 is a diagram showing an example of an RAID group using parity rotation that has been incrementally expanded. The example RAID group shown in FIG. 16 originally included five physical drives (Dev 0 through Dev 4). After a first expansion in which two new drives were added, the RAID group was expanded to include seven physical drives (Dev 0 through Dev 6). After a second expansion in which another new drive was added, the RAID group was expanded to include eight physical drives (Dev 0 through Dev 7). Because the expanded stripe of the RAID group was opportunistically written to (e.g., using a garbage collection mechanism), not every stripe stores valid data in the same number of drives. In the example of FIG. 16, table 1602 is an example table, stored in either volatile or non-volatile memory, which indicates how many drives store valid data for each stripe of the RAID group. As shown in table 1602, Stripes 0, 2, and 6 each stores valid data and parity in the first seven physical drives (Dev 0 through Dev 6) of the RAID group; Stripes 1 and 5 each stores valid data and parity in the first five physical drives (Dev 0 through Dev 4) of the RAID group; Stripes 3 and 7 each stores valid data and parity in all eight physical drives (Dev 0 through Dev 7) of the RAID group; and Stripe 4 has never been written to and so does not store valid data and parity in any drives. While not shown in FIG. 16, each stripe unit of the RAID group that stores valid data or parity may include a stripe unit header that includes at least the stripe number to which the stripe unit belongs and the number of drives that store valid data in that stripe. Table 1602 may have been generated by reading such stripe unit headers using a process such as, for example, process 1100 of FIG. 11, above. Table 1602 may also be updated using process 1300 of FIG. 13, above, or process 1400 of FIG. 14, above, for example.

An example that uses the information of table 1602 to process an object read request to the RAID group of FIG. 16 is as follows:

An object read request for Object X is received and the request includes the object's address. In this example, the object's address includes the following information:

Stripe number=2

Logical drive number=2

Offset in stripe unit=1500 bytes

Because parity rotation is used in the RAID group of FIG. 16, the number of drives that store valid data in Stripe 2 (that is identified in the request) is needed to map/translate the logical drive number of the request to the correct physical drive number of the RAID group.

As mentioned above, example formula (1) below may be used to translate the logical drive number of the request to the correct physical drive number of the RAID group. Formula (1) is reproduced below:

$$P = (L+S) \% N \tag{1}$$

Where P is the physical drive number, L is the logical drive number, % is the modulo (i.e., remainder when divided by N) operator, S is the stripe number, and N is the number of drives that store valid data in stripe S.

Table 1602 can be consulted to determine that Stripe 2 includes seven drives that store valid data. As such, in this example, L is 2, S is 2, and N is 7. So for this example, formula (1) can be rewritten to be the following:

$$P=(2+2)\% 7=4$$

Physical drive number 4 is Dev 4 in the RAID group of FIG. 16. As such, the object read request for Object X may be completed by read the valid data (D2) (starting from 1500 bytes) stored on physical drive number D4 at Stripe 2.

If table 1602 did not exist and instead, the number of drives that store valid data in the stripe to which an object is written is encoded into that object's address, an object read request to the RAID group of FIG. 16 may be handled as shown in the following example:

An object read request for Object X is received and the request includes the object's address. In this example, the object's address includes the following information:
Stripe number=2
Logical drive number=2
Offset in stripe unit=1500 bytes
Number of drives in stripe=7

Because parity rotation is used in the RAID group of FIG. 16, the number of drives that store valid data in Stripe 2 (that is identified in the request) is needed to map/translate the logical drive number of the request to the correct physical drive number of the RAID group.

As mentioned above, example formula (1) below may be used to translate the logical drive number of the request to the correct physical drive number of the RAID group. Formula (1) is reproduced below:

$$P=(L+S)\% N \qquad (1)$$

Where P is the physical drive number, L is the logical drive number, % is the modulo (i.e., remainder when divided by N) operator, S is the stripe number, and N is the number of drives that store valid data in stripe S.

Since the number of drives that store valid data in the stripe to which Object X was written was encoded into Object X's address, which was included in the object read request, the value of N for formula (1) is directly obtained from the object read request. As such, in this example, L is 2, S is 2, and N is 7. So for this example, formula (1) can be rewritten to be the following:

$$P=(2+2)\% 7=4$$

Physical drive number 4 is Dev 4 in the RAID group of FIG. 16. As such, the object read request for Object X may be completed by read the valid data (D2) (starting from 1500 bytes) stored on physical drive number D4 at Stripe 2.

As shown with FIG. 16, regardless of how the metadata that indicates which drives store valid data in each stripe is obtained, such metadata can be obtained and used to map/translate a read request to the correct physical drive of the expanded RAID group.

In some embodiments, information about how many and which storage drives are currently part of a RAID group is encoded and stored in "group headers" that are written to specific location(s) (e.g., rows) on each storage drive in a RAID group. When new storage drives are added to the RAID group, this fact is recorded in the group headers. One way to ensure that group headers are written consistently after an expansion of the RAID group is to first write the headers to all the storage drives including the new storage drives to a completely different set of locations from the locations of the group headers currently in use. Only when these group headers have been written to all storage drives would these new headers be switched over to, at which point the old headers can be safely discarded/ignored. By using group headers as described herein, it is possible to additionally achieve rollback, so that if the expansion does not successfully go through for any reason (e.g., one or more new storage drives fail or they are not visible from all controllers), the system can be restored to the previous number of operating drives before any new data can be written to the new drives.

Often, in dual-controller or multi-controller systems, multiple controllers have direct access to the underlying storage drive through independent physical connection. In some embodiments, a controller is a hardware entity (e.g., a CPU with memory) and not related to the RAID layer. In various embodiments, a system includes two controllers for redundancy, so that if one of the controllers fails, another can take over for it. Access to the storage drives is shared; i.e., either controller can access the drives, but typically only one controller will be accessing them at any given instant in an active/passive model. It is also possible to have an active/active model in which both controllers can be simultaneously accessing drives and working in tandem to provide higher performance to the user, but in such cases if one of the controllers fails the user may see a subsequent drop in performance.

The purpose is to maintain multiple independent and redundant paths to the storage drive so that failure can be tolerated and sometimes for performance reasons. When a new storage drive is introduced in the system, it is expected that a physical connection established with all the controllers to maintain the same level of connectivity and redundancy as the other storage drives in the system. Sometimes, this does not happen and a newly introduced storage drive has a valid physical connection from some controllers but not all. This can be due to hardware or software errors. In the event of expansion, if the new storage drives are visible from the primary controller, which is performing expansion, then the expansion based IO's will go through properly. But when the second controller takes over (e.g., in the event of a failover), the expanded new storage drives may not be accessible, leading to potentially complete system failure or at best, a degraded state. The technique of storing the expanded state group header information to a new location instead of updating the existing group headers using a consensus based protocol allows for a simpler all-or-nothing approach for the specific use case of expansion. It does not tolerate failures during expansion, as the consensus protocol would, but instead allows for the atomic reversion to the pre-expansion state if there is any failure before any new data is written. The advantage is that reversion to the pre-expansion is simpler than implementing a rollback after a commit. This technique allows for the expansion from the primary controller, the verification on the expansion from the secondary controller, and reversion (if needed) to the pre-expansion state, in a simple way, if there are errors discovered on the secondary controller.

Figure 17:
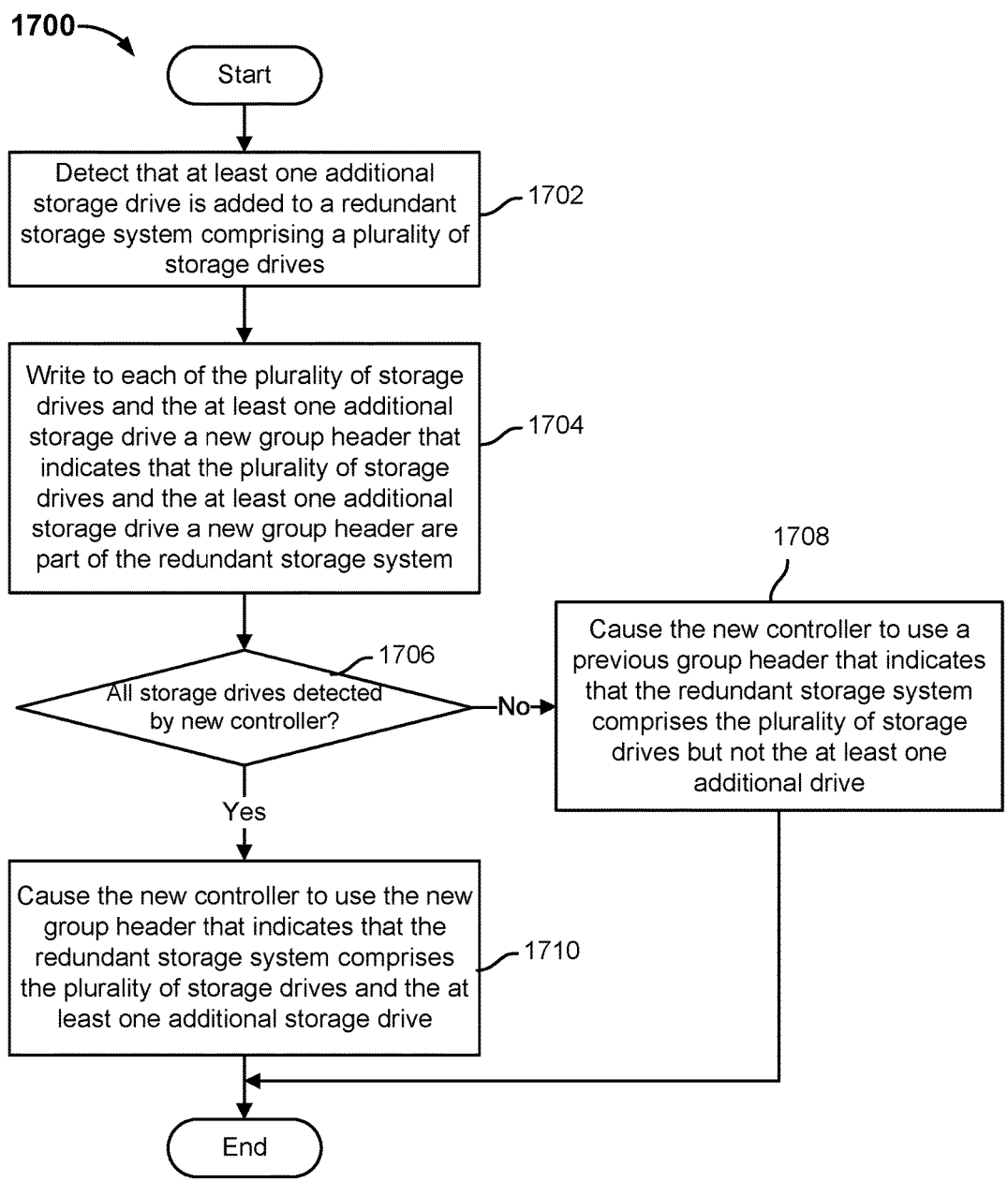
FIG. 17 is a flow diagram showing an example of a process for performing a two-phase commit for ensuring that a consistent view of the storage drives of a redundant storage system is available at any time.

FIG. 17 is a flow diagram showing an example of a process for performing a two-phase commit for ensuring that a consistent view of the storage drives of a redundant storage system is available at any time. In some embodiments, process 1700 may be implemented by using RAID layer 102 of FIG. 1.

Process 1700 describes an example process of determining when to commit to a new group header associated with a RAID group and when to rollback to a previous group header associated with the RAID group. Process 1700 may be implemented in the event that the RAID system performs a failover between two controllers. As such, process 1700 may be used to determine whether the new controller should refer to the new group header or a previous group header.

At 1702, it is determined that at least one additional storage drive is added to a redundant storage system comprising a plurality of storage drives. It is determined that at least one new storage drive has been added to a RAID group.

At 1704, a new group header that indicates that the plurality of storage drives and the at least one additional storage drive are part of the redundant storage system is written to each of the plurality of storage drives and the at least one additional storage drive. Due to the expansion of the RAID group, a new group header that identifies all the storage drives of the RAID group, including the one or more additional new storage drives, is written to each storage drive of the RAID group.

At 1706, it is determined whether all storage drives included in the redundant storage system are detected by a new controller. In the event that all storage drives included in the redundant storage system have been detected by the new controller, control is transferred to 1710. Otherwise, in the event that less than all storage drives included in the redundant storage system have been detected by the new controller, control is transferred to 1708. It is determined whether the new controller can detect each of the storage drives in the RAID group. For example, the new controller may not be able to detect every storage drive in the RAID group in the event that a storage drive crashes, there is a power failure, and/or any other loss of connection.

At 1708, the new controller is caused to use a previous group header that indicates that the redundant storage system comprises the plurality of storage drives but not the at least one additional storage drive. If at least one storage drive of the RAID group cannot be detected by the new controller, then a previous group header written to a (e.g., previous row) of each individual storage drive is referred to. The previous group header identifies only the storage drives that existed prior to the recent expansion as being part of the RAID group. The previous group header does not identify the at least one new additional storage drive as being part of the RAID group.

At 1710, the new controller is caused to use the new group header that indicates that the redundant storage system comprises the plurality of storage drives and the at least one additional storage drive. If all storage drives of the RAID group can be detected by the new controller, then the new group header written to a (e.g., new row) of each individual storage drive is referred to. The new group header identifies both the storage drives that existed prior to the recent expansion and the at least one new additional storage drive as being part of the RAID group.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A redundant storage system comprising a plurality of storage drives, comprising:
    a processor configured to:
        receive an indication to expand the redundant storage system, wherein the plurality of storage drives includes an original number of storage drives, wherein the redundant storage system comprises at least a first stripe and a second stripe;
        expand the redundant storage system by adding one or more new storage drives to the plurality of storage drives, wherein a combination of the one or more new storage drives and the plurality of storage drives includes an expanded number of storage drives, wherein the expanded number of storage drives is greater than the original number of storage drives;
        write first valid data across the expanded number of storage drives in the first stripe associated with the redundant storage system; and
        store metadata that indicates that:
            the first stripe stores the first valid data across the expanded number of storage drives; and
            the second stripe stores second valid data across the original number of storage drives but not in the one or more new storage drives.

2. The redundant storage system of claim 1, wherein the redundant storage system comprises a redundant array of independent disks (RAID) system.

3. The redundant storage system of claim 1, wherein to write the first valid data across the expanded number of storage drives in the first stripe associated with the redundant storage system comprises to:
    detect that the one or more new storage drives are added to the plurality of storage drives;
    expand a size of a buffer to span the first stripe across the expanded number of storage drives;
    store a plurality of objects in the buffer;
    determine that the buffer has met a flush condition; and
    write the plurality of objects stored in the buffer to the first stripe.

4. The redundant storage system of claim 3, wherein the buffer comprises an in-memory buffer.

5. The redundant storage system of claim 3, wherein the flush condition comprises at least a threshold percentage of a capacity of the buffer being filled with data.

6. The redundant storage system of claim 1, wherein the processor is further configured to:
    receive an object read request;
    obtain a stripe number, a logical drive number, and an offset within a stripe unit from the object read request;
    retrieve the metadata; and
    use the metadata, the stripe number, the logical drive number, and the offset within the stripe unit to process the object read request.

7. The redundant storage system of claim 1, wherein the processor is further configured to:
    read stripe unit headers corresponding to respective ones of at least a subset of stripe units associated with each stripe included in a plurality of stripes of the redundant storage system to determine which storage drives store valid data in that stripe;
    generate the metadata based at least in part on the read stripe unit headers; and
    store the metadata.

8. The redundant storage system of claim 1, wherein the processor is further configured to:
    receive an object read request;
    read stripe unit headers associated with a third stripe that is identified in the object read request to determine which one or more storage drives store valid data in the third stripe; and
    update the metadata based on the read stripe unit headers.

9. The redundant storage system of claim 1, wherein the processor is further configured to:
    determine that a third stripe included in the redundant storage system has been written to; and update the metadata based at least in part on the third stripe included in the redundant storage system that has been written to.

10. The redundant storage system of claim 1, wherein the processor is further configured to:
    determine that a third stripe included in the redundant storage system has been written to;
    update log data to include which stripe units within the third stripe now store valid data; and
    update the metadata based at least in part on the log data.

11. The redundant storage system of claim 1, wherein the processor is further configured to:
    receive an object read request;
    obtain a stripe number, a logical drive number, an offset within a stripe unit, and a number of storage drives in the redundant storage system that stores valid data for a stripe associated with the stripe number from the object read request; and
    use the stripe number, the logical drive number, the offset within the stripe unit, and the number of storage drives in the redundant storage system that stores valid data for the stripe associated with the stripe number to process the object read request.

12. The redundant storage system of claim 1, wherein the redundant storage system is permitted to be expanded by N number of storage drives in one incremental expansion, where N is an integer that is at least one.

13. The redundant storage system of claim 1, wherein the processor is further configured to:
    detect that the one or more new storage drives are added to the redundant storage system;
    write to each of the plurality of storage drives and the one or more new storage drives of the redundant storage system a new group header that indicates that the plurality of storage drives and the one or more new storage drives are part of the redundant storage system;
    determine that fewer than each one of the plurality of storage drives and the one or more new storage drives is detected by a new controller; and
    cause the new controller to use a previous group header that indicates that the redundant storage system comprises the plurality of storage drives but not the one or more new storage drives.

14. The redundant storage system of claim 1, wherein the processor is further configured to:
    detect that the one or more new storage drives are added to the redundant storage system;
    write to each of the plurality of storage drives and the one or more new storage drives a new group header that indicates that the plurality of storage drives and the one or more new storage drives are part of the redundant storage system;
    determine that no fewer than each one of the plurality of storage drives and the one or more new storage drives is detected by a new controller; and
    cause the new controller to use the new group header that indicates that the redundant storage system comprises the plurality of storage drives and the one or more new storage drives.

15. A method, comprising:
    receiving an indication to expand a redundant storage system, wherein the redundant storage system comprises a plurality of storage drives, wherein the plurality of storage drives includes an original number of storage drives, wherein the redundant storage system comprises at least a first stripe and a second stripe;
    expanding the redundant storage system by adding one or more new storage drives to the plurality of storage drives, wherein a combination of the one or more new storage drives and the plurality of storage drives includes an expanded number of storage drives, wherein the expanded number of storage drives is greater than the original number of storage drives;
    writing first valid data across the expanded number of storage drives in the first stripe associated with the redundant storage system; and
    storing metadata that indicates that:
        the first stripe stores the first valid data across the expanded number of storage drives; and
        the second stripe stores second valid data across the original number of storage drives but not in the one or more new storage drives.

16. The method of claim 15, further comprising:
    receiving an object read request;
    obtaining a stripe number, a logical drive number, and an offset within a stripe unit from the object read request;
    retrieving the metadata; and
    using the metadata, the stripe number, the logical drive number, and the offset within the stripe unit to process the object read request.

17. The method of claim 15, further comprising:
    reading stripe unit headers corresponding to respective ones of at least a subset of stripe units associated with each stripe included in a plurality of stripes of the redundant storage system to determine which storage drives store valid data in that stripe;
    generating the metadata based at least in part on the read stripe unit headers; and
    storing the metadata.

18. The method of claim 15, further comprising:
    receiving an object read request;
    obtaining a stripe number, a logical drive number, an offset within a stripe unit, and a number of storage drives in the redundant storage system that stores valid data for a stripe associated with the stripe number from the object read request; and
    using the stripe number, the logical drive number, the offset within the stripe unit, and the number of storage drives in the redundant storage system that stores valid data for the stripe associated with the stripe number to process the object read request.

19. The method of claim 15, wherein the redundant storage system is permitted to be expanded by N number of storage drives in one incremental expansion, where N is an integer that is at least one.

20. A computer program product, the computer program product being embodied in a non-transitory computer readable storage medium and comprising computer instructions for:
    receiving an indication to expand a redundant storage system, wherein the redundant storage system comprises a plurality of storage drives, wherein the plurality of storage drives includes an original number of storage drives, wherein the redundant storage system comprises at least a first stripe and a second stripe;
    expanding the redundant storage system by adding one or more new storage drives to the plurality of storage drives, wherein a combination of the one or more new storage drives and the plurality of storage drives includes an expanded number of storage drives, wherein the expanded number of storage drives is greater than the original number of storage drives;

writing first valid data across the expanded number of storage drives in the first stripe associated with the redundant storage system; and storing metadata that indicates that:
- the first stripe stores the first valid data across the expanded number of storage drives; and
- the second stripe stores second valid data across the original number of storage drives but not in the one or more new storage drives.

\* \* \* \* \*